(12) United States Patent
Said et al.

(10) Patent No.: US 9,077,717 B2
(45) Date of Patent: Jul. 7, 2015

(54) PROPAGATION AND ADOPTION OF EXTENSIONS ACROSS APPLICATIONS IN NETWORKED SOLUTIONS

(71) Applicants: Bare Said, St. Leon-Rot (DE); Peter Eberlein, Malsch (DE)

(72) Inventors: Bare Said, St. Leon-Rot (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 210 days.

(21) Appl. No.: 13/690,478

(22) Filed: Nov. 30, 2012

(65) Prior Publication Data

US 2014/0156724 A1    Jun. 5, 2014

(51) Int. Cl.
H04L 29/08    (2006.01)

(52) U.S. Cl.
CPC .............. H04L 67/10 (2013.01); H04L 29/08 (2013.01)

(58) Field of Classification Search
USPC ......................................... 709/203
See application file for complete search history.

(56) References Cited

U.S. PATENT DOCUMENTS

| | | |
|---|---|---|
| 7,657,575 B2 | 2/2010 | Eberlein et al. |
| 7,702,650 B2 | 4/2010 | Brunswig et al. |
| 7,720,992 B2 | 5/2010 | Brendle et al. |
| 7,725,907 B2 | 5/2010 | Bloching et al. |
| 7,730,412 B2 | 6/2010 | Said |
| 7,734,648 B2 | 6/2010 | Eberlein |
| 7,739,387 B2 | 6/2010 | Eberlein et al. |
| 7,877,695 B2 | 1/2011 | Brunswig et al. |
| 7,900,190 B2 | 3/2011 | Brunswig et al. |
| 7,971,209 B2 | 6/2011 | Eberlein et al. |
| 8,126,919 B2 | 2/2012 | Eberlein |
| 8,135,689 B2 | 3/2012 | Said et al. |
| 8,205,195 B2 | 6/2012 | Wagner et al. |
| 8,225,303 B2 | 7/2012 | Wagner et al. |
| 8,234,308 B2 | 7/2012 | Brunswig et al. |
| 8,250,135 B2 | 8/2012 | Driesen et al. |
| 8,301,610 B2 | 10/2012 | Driesen et al. |
| 8,438,119 B2 | 5/2013 | Puteick et al. |
| 8,467,817 B2 | 6/2013 | Said et al. |
| 8,863,075 B2 | 10/2014 | Said et al. |
| 2007/0022155 A1* | 1/2007 | Owens et al. ................ 709/202 |
| 2008/0082575 A1 | 4/2008 | Peter et al. |
| 2011/0035742 A1* | 2/2011 | Shenfield .................... 717/171 |
| 2011/0145571 A1 | 6/2011 | Schmidt-Karaca et al. |
| 2011/0307348 A1 | 12/2011 | Haury et al. |
| 2012/0005670 A1 | 1/2012 | Driesen et al. |
| 2012/0011389 A1 | 1/2012 | Driesen et al. |
| 2012/0030184 A1 | 2/2012 | Driesen et al. |
| 2012/0036165 A1 | 2/2012 | Driesen et al. |
| 2012/0047185 A1 | 2/2012 | Driesen et al. |
| 2012/0131101 A1 | 5/2012 | Said |
| 2012/0158416 A1 | 6/2012 | Brunswig et al. |
| 2012/0159446 A1 | 6/2012 | Jentsch et al. |
| 2012/0166620 A1 | 6/2012 | Said et al. |
| 2012/0166984 A1 | 6/2012 | Brunswig et al. |
| 2012/0167056 A1 | 6/2012 | Brunswig et al. |

(Continued)

Primary Examiner — Ebrahim Goldabbakhsh
(74) Attorney, Agent, or Firm — Fish & Richardson P.C.

(57) ABSTRACT

The present disclosure describes methods, systems, and computer program products for adoption of an extension of a service across networked applications. One process includes receiving, by a target platform operating a target networked application, a data package associated with the extension, the data package comprising data specifying the service to be extended and information associated with a technology of a source platform at which the data package was created, extracting a portion of the data from the data package, and implementing the extracted portion of the data in the service of the target application.

23 Claims, 6 Drawing Sheets

(56) References Cited

U.S. PATENT DOCUMENTS

| | | |
|---|---|---|
| 2012/0167200 A1 | 6/2012 | Buchholz et al. |
| 2013/0046894 A1 | 2/2013 | Said et al. |
| 2013/0080617 A1 | 3/2013 | Driesen et al. |
| 2013/0144945 A1 | 6/2013 | Said et al. |
| 2013/0324201 A1 | 12/2013 | Eberlein et al. |

* cited by examiner

PROPAGATION AND ADOPTION OF EXTENSIONS ACROSS APPLICATIONS IN NETWORKED SOLUTIONS

TECHNICAL FIELD

The present disclosure relates to software, computer systems, and computer-implemented methods for adoption of an extension of a service across networked applications.

BACKGROUND

Modern networked applications can enable customers to access and leverage updates efficiently. In many instances, customers can access data from a single networked application, for example, from a single business product. For data exchange between different networked applications or business products, data may need to be copied, transferred, or manipulated in other means to be used. For example, customer data stored in a sales order business product may be read and copied or duplicated to be useable in another business application or system. In some other instances, a central database (e.g., held by a third party) may also be used to provide copies of the business data to multiple applications or business products.

SUMMARY

The present disclosure describes methods, systems, and computer program products for adoption of an extension of a service across networked applications.

In a general aspect 1, a computer-implemented method for adoption of an extension of a service across networked applications, the method comprising: receiving, by a target platform operating a target networked application, a data package associated with the extension, the data package comprising data specifying the service to be extended and information specifying the source platform at which the data package was created; extracting a portion of the data from the data package; and implementing the extracted portion of the data in the service of the target application.

Aspect 2 according to aspect 1, is further comprising: creating the data package at the source platform, wherein the source platform operates a source networked application that is communicatively coupled to the target networked application or to a cloud solution directory.

Aspect 3 according to any one of aspects 1 to 2, wherein the data and the information of the data package are arranged in a data structure configured to be propagated across the networked applications, the networked applications comprising the source networked application and the target networked application.

Aspect 4 according to any one of aspects 1 to 3, wherein the information specifying the source platform specifies a technology the source platform is based on, wherein the target networked application is operated by a target platform, and wherein the source platform and the target platform are based on different technologies, wherein the technologies are different by at least one of operating system, hardware infrastructure and software development platform.

Aspect 5 according to any one of aspects 1 to 4, wherein the networked applications comprise the target networked application and the source networked application and the networked applications being distributed within a network, wherein the network is a cloud-computing environment including a cloud solution directory and the method is further comprising: announcing that the data package was created; and discovering that the data package being announced.

Aspect 6 according to any one of aspects 2 to 5, wherein upon creating the data package at the source platform, the data package being transmitted to the target networked application that is connected via a peer-to-peer connection with the source networked application.

Aspect 7 according to any one of aspects 2 to 6, wherein upon creating the data package at the source platform, the data package being transmitted to the cloud solution directory where the data package being accessible on demand by the target networked application, or where the data package being accessible during the discovering when the associated service is accessed by the target networked application.

Aspect 8 according to any one of aspects 1 to 7, further comprising collecting or creating the data by the source networked application, and collecting or creating the information specifying the technology of the source platform, wherein the technology is at least one of operating system, hardware infrastructure and software infrastructure.

Aspect 9 according to any one of aspects 1 to 8, wherein the information is header information that describes the technology of the source platform and/or the source networked application, wherein the technology is at least one of operating system, hardware infrastructure and software development platform.

Aspect 10 according to any one of aspects 1 to 9, further comprising arranging at least a portion of the data of the data package in a data structure configured to be implemented in the service within the target networked application by extracting the portion and subsequently forwarding of the portion to the service.

Aspect 11 according to any one of aspects 1 to 10, the data package further comprising additional data associated with an entity related to the service, wherein the additional data specifying an extension of the entity, and wherein the additional data being configured to be implemented in the target networked application.

Aspect 12 according to any one of aspects 1 to 11, wherein the service to be extended may be a generic extension of a service interface of the networked applications within the network environment and the related entities may be one or more business objects and/or one or more user interface extensions, wherein the business object is a representation of an intelligible business or non-business entity, such as an account, an order, employee, an invoice or a financial report.

Aspect 13 according to any one of aspects 1 to 12, further comprising announcing, within a network comprising the source networked application and the cloud solutions landscape directory, that the data package was created.

Aspect 14 according to any one of aspects 1 to 12, further comprising announcing, within a network comprising the source networked application and at least one of the target networked applications, that the data package was created.

Aspect 15 according to aspect 13, further comprising discovering, within a network comprising the target networked application and the cloud solutions landscape directory, that the data package was created.

Aspect 16 according to aspect 14, further comprising discovering, within a network comprising the source networked application and the target networked applications, that the data package was created.

A general aspect 17, comprising: creating, by a source networked application operated by a source platform, a data package associated with the extension, the data package comprising data specifying the service to be extended and information specifying with the source platform, wherein the data and the information of the data package are arranged in a data structure configured to be propagated across the networked applications, the networked applications comprising the source networked application and a target networked application, and wherein the source networked application is communicatively coupled to the target networked application or to a cloud solution directory.

A general aspect 18, comprising: creating, by a source networked application operated by a source platform, a data package associated with the extension, the data package comprising data specifying the service to be extended and information specifying the source platform, wherein the data and the information of the data package are arranged in a data structure configured to be propagated across the networked applications, the networked applications comprising the source networked application and a target networked application, and wherein the source networked application is communicatively coupled to the target networked application or to a cloud solution directory; announcing that the data package was created; discovering that the data package being announced; receiving, by a target platform operating the target networked application, the data package associated with the extension; extracting a portion of the data from the data package; and implementing the extracted portion of the data in the service of the target application.

Aspect 19 according to any one of aspects 1 to 18, further comprising implementing of extracted portion of the data of the data package based at least on one of: the information specifying the source platform, the extracted portion of the data and a technology of the target platform operating the target networked application.

Aspect 20 according to any one of aspects 1 to 19, wherein at least the portion of the data of the data package is arranged in a data structure configured to be implemented in the service within the target networked application by extracting the portion and subsequently forwarding of the portion to the service.

Aspect 21 according to aspect 20, wherein the data of the data package further comprises additional data associated with at least one entity related to the service, wherein the additional data specifying an extension of the entity, and wherein the additional data being configured to be implemented in the target networked application.

Aspect 22 according to aspect 21, further comprising extracting a second portion of the additional data associated with the entity related to the service and subsequently forwarding the second portion to the entity within the target networked application.

Aspect 23 according to any one of aspects 1 to 22, wherein the data specifying structure and/or implementation logic of the service to be extended.

Aspect 24 according to any one of aspects 1 to 23, wherein the data in the data package being written in Extensible Markup Language (XML).

Aspect 25 according to any one of aspects 1 to 24, wherein the information specifying the source platform specifies a technology the source platform is based on, wherein the technology of the source platform is different from a technology of the target platform by at least one of operating system, hardware infrastructure and software development platform.

Aspect 26 according to aspect 25, wherein an amount of data from the data package implemented in the target networked application depends on a degree of similarity between technologies the source and target application are based on.

Aspect 27 according to any one of aspects 1 to 26, wherein the data specifying the service to be extended comprises metadata of the extension of the service.

Aspect 28 according to any one of aspects 11, 12, 22 and 23, wherein all other entities related to the service are implemented in the target networked application in case of similar technology of target and source networked application and some of the entities are implemented in the target networked application in case of partially similar technology of target and source networked application.

Aspect 29 according to any one of aspects 1 to 28, wherein the extension of the service is an extension of a functionality or attribute associated with a service interface, a business logic, a business object or a user interface within a networked application.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

Figure 1:
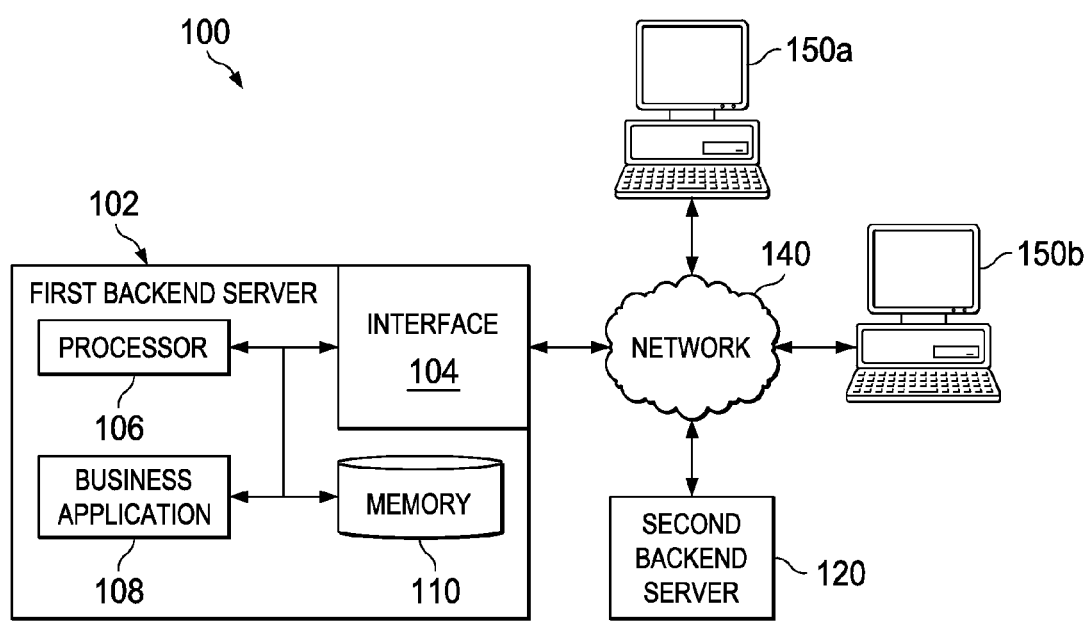
FIG. 1 illustrates an example of a network environment.

Reference numbers and designations in the various drawings indicate exemplary aspects, implementations or embodiments of particular features of the present disclosure.

DETAILED DESCRIPTION

This disclosure generally relates to software, computer systems, and computer-implemented methods for adoption of an extension of a service across networked applications. Specifically, propagation and adoption of service extensions across networked applications is provided that are especially adapted to cloud-computing network environments. Implementations of the present disclosure described herein may provide one or more of the following advantages:

First, service extensions natively created in a networked application may be propagated and deployed to other networked applications in an easy and rapid manner with near-zero propagation and adoption efforts.

Second, a flexible service extension independent of platform technology or location of the platform is provided.

Third, the aspects described herein are not restricted to service interfaces but may support other entities even in case that networked applications are based on different development technology.

Fourth, a cloud-computing environment especially adapted to multiple platform technologies is provided that allows on-demand service extensions across networked applications.

Fifth, the total cost of ownership in network environments may be reduced.

Software products (e.g., networked applications) can be built upon a platform, where the platform is used as a basis upon which multiple applications are developed "on top" of, or based upon, the platform. As one example, proprietary on-demand business process platforms can be used to create many on-demand products, as well as, networked applications (NWAs) built using at least a portion of the platform. In certain implementations, on-demand products can be a fully integrated enterprise resource planning (ERP), or business management software solutions. The on-demand products can be a complete software-as-a-service (SaaS) system in which software and its associated data are hosted centrally (for example, in a cloud-computing environment), and are accessed by users using a thin client (e.g., a web browser) over the internet.

An on-demand product may include functionality for integrated end-to-end business processes across several modules, including Customer Relationship Management (CRM), Financial Management (FM), Project Management (PM), Supply Chain Management (SCM), Supplier Relationship Management (SRM), Human Resources Management (HRM), Executive Management Support (EMS), and Compliance Management (CM). CRM supports processes that span marketing, sales, and service activities. FM can be another module that helps provide companies with a single, up-to-date view of the financial condition by integrating core business processes and financials that span financial, management, accounting, and cash flow management. PM can contain an integrated project management solution. SCM can cover supply chain setup management, supply chain planning and control, and manufacturing, warehousing and logistics. SRM focuses on relationships with supplies, procurement processes aimed at reducing cost, and to perform self-service procurement. HRM spans organizational management, human resources, and employee self-service. EMS can empower management with more control over the business and better decision making, with real time analytics for tracking business aspects. CM helps companies maintain compliance with changing laws and regulations and to meet regulatory standards. Some, all, or other modules or functionalities may exist in particular on-demand products.

As users are engaging the on-demand products in their businesses, data in various aspects of the modules and functionalities are generated. Some of the data may be shared to promote their businesses and/or product uses. For example, data can be shared with other business partners to streamline supply and demand. Other data can be shared to attract future collaboration partners. By using a common platform among users of on-demand business applications, establishment of a business network can be facilitated between two or more of those users. The common platform may include use of an identical platform, different versions of the common platform, and different applications based on the common platform, among others. For example, collaboration, data-sharing and business network capabilities can be provided as embedded functionality in the on-demand business applications based on the common platform. Customers that are willing to participate in the network can be automatically visible to other network participants. Two or more customers can be connected to each other if both of them accept to establish a network relationship, which enables data sharing without restriction to specific data, information, and other collaboration materials.

The data sharing can be performed between connected systems associated with the same business application, or from several networked business applications based on the common platform. Multiple networked applications are built upon the common platform that enables integrated infrastructure for data implementation and generation. In some implementations, a master copy of the data is stored in one application and can be accessed in another application without any data replication. For example, a first application may need data from a second application for certain business operations. The first application, through its interfaces and network connections, sends a data request to the second application. The second application can provide the requested data to the first application by first locking the master copy of the data and providing an access connection. The first application can then interact with the master copy of the data via the access connection. After using the data in the first application, the access connection is terminated and the data is unlocked in the second application so that requests of access can be accepted from other applications, or from the first application.

At a high level, various business applications running on different systems or tenants can be enabled to share the same business data in a flexible manner to tailor different scenarios. For each networked application, administrators, or where appropriate, customers or other users, may individually define which business data can be shared. The administrators may also individually define which networked application should be declared as the master application for the defined shared business data. The master networked application is a property related to a combination of application and business data used by the applications in a federation context or networked solutions, instead of a property related to system or application. For example, a networked solution can be made of several networked applications, each of which may have the role of master application for specific business data. The business data in a federation context may be assigned only to one single master application. When an application is classified as master application for specific business data, that business data is persisted on the primary persistency or database of this networked application. The business data may be changed directly and without the usage of replication or proxy data by other networked applications. The changes can be updated to the primary database in the master application. In some implementations, administrators or customers may assign a master application for one or more business objects and/or other particular data objects at the time of application deployment. The business object encapsulates the business data, where changes made to the business data are made in or are associated with the corresponding business object, as well. The assignment can be performed based on an optimization strategy and rules defined by the customers for optimizing the networked solution. In an aspect, the business object is a representation of an intelligible business or non-business entity, such as an account, an order, employee, an invoice or a financial report.

FIG. 1 illustrates an example environment 100 for implementing various features of a system for sharing data across networked applications. The illustrated environment 100 includes, or is communicably coupled with, a front-end client 150*a-b* which represents a customer or a user in a cloud-computing environment and backend server systems 102, 120. In some instances, the front-end client 150*a-b* may co-reside on a single server or system, as appropriate. At least some of the communications between the front-end client 150*a-b* and the backend servers 102, 120 may be performed across or via network 140. In general, environment 100 depicts an example configuration of a system for establishing business networks using networked applications built on a shared platform in a cloud computing environment, such as environment 100. The illustrated system includes development technology and hosted and managed services and applications built on top of the underlying platform technology. In an aspect, the term "technology" is understood to be at least one of operating system, hardware infrastructure and software development platform. In an implementation of the present disclosure described herein, the term "technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "technology" comprises ByDesign platform, Success Factors Platform, ERP Suite technology or in-memory database such as High Performance Analytic Appliance (HANA) platform. In an aspect, the source and target networked applications may be based on two different technologies out of ByDesign platform, Success Factors Platform, ERP Suite technology or in-memory database such as High Performance Analytic Appliance (HANA) platform.

The illustrated environment 100 of FIG. 1 includes one or more front-end clients 150*a-b*. The front-end client 150*a-b* may be associated with a particular business application or development context, as well as a particular platform-based application system. The front-end client 150*a-b* may be any computing device operable to connect to or communicate with at least one of the backend servers 102, 120 using a wireline or wireless connection via the network 140, or another suitable communication means or channel. In some instances, the front-end client 150*a*—may be a part of or associated with a business process involving one or more business applications, or alternatively, a remote developer associated with the platform or a related platform-based application.

In general, the front-end client 150*a-b* includes a processor, an interface, a networked application or application interface, a graphical user interface (GUI), and a memory. In general, the front-end client 150*a-b* includes electronic computer devices operable to receive, transmit, process, and store any appropriate data associated with the environment 100 of FIG. 1. The networked application or application interface can enable the front-end client 150*a-b* to access and interact with applications and modules in backend server systems using a common or similar platform. It will be understood that there may be any number of front-end clients 150*a-b* associated with, or external to, environment 100. For example, while illustrated environment 100 includes one front-end client 150*a-b*, alternative implementations of environment 100 may include multiple clients communicably coupled to the one or more of the systems illustrated. In some instances, one or more front-end clients 150*a-b* may be associated with administrators of the environment, and may be capable of accessing and interacting with the settings and operations of one or more business applications, and/or other components of the illustrated environment 100. Additionally, there may also be one or more additional front-end clients 150*a-b* external to the illustrated portion of environment 100 capable of interacting with the environment 100 via the network 140. Further, the terms "client," "customer," and "user" may be used interchangeably as appropriate without departing from the scope of this disclosure. Moreover, while the front-end client 150*a-b* is described in terms of being used by a single user, this disclosure contemplates that many users may use one computer, or that one user may use multiple computers. In general, clients may usually belong to one customer or company. Several employees of the customer, called users, can use the applications deployed on the corresponding client. For instance, the term "client" refers to a system providing a set of business applications belonging to or rented by a particular customer or business entity. Several employees of that particular customer or business entity can be users of that client and use the business applications provided by or available on this client.

The backend servers 102, 120 represent dedicated and/or ad hoc systems built using the platform technology for coordinating collaboration with other systems associated with and executing on platform-related technology. The coordinating system is used to manage and operate the system and clients belonging to the cloud computing environment, providing knowledge of and connections to the various systems, clients, and clients therein. The backend servers 102, 120 are enhanced to support data sharing and collaboration capabilities. The front-end client 150*a-b* can access certain business applications built upon a similar, or common, on-demand platform. For example, the front-end client 150*a-b* may request certain data or data objects in a business application running in the backend server 102; and the request may be executed via the first backend server 102 at the second backend server 120 where the requested data is stored as a master copy. The data stored in the second backend server 120 may be locked and accessed by the first backend server 102, and interacted with the front-end client 150*a-b*. In other instances, the data may be used by an application associated with one of the other backend servers 120 for processing applications associated with those systems. The environment 100 is an example and, in alternative implementations, the elements illustrated in FIG. 1 may be included in or associated with different and/or additional servers, clients, networks, and locations other than those as shown. For example, one or more of the components illustrated within the backend servers 102, 120 may be located in multiple or different servers, cloud-based or cloud computing networks, or other locations accessible to the backend servers 102, 120 (e.g., either directly or indirectly via network 140).

In general, the backend servers 102, 120 can be any server or system that stores, manages, and executes functionality associated with an on-demand platform, including assisting in establishing ad hoc collaboration business networks between two or more users or entities executing applications based on a common platform. In some instances, the backend servers 102, 120 may execute one or more business applications (e.g., 108 of FIG. 1). For example, each backend server 102, 120 may be a Java 2 Platform, Enterprise Edition (J2EE)-compliant application server that includes technologies such as Enterprise JavaBeans® (EJB), J2EE Connector Architecture (JCA), Java Messaging Service (JMS), Java Naming and Directory Interface (JNDI), and Java Database Connectivity (JDBC). In some instances, each of the backend servers 102, 120 may store a plurality of various applications, while in other instances, the backend servers 102, 120, and 130 may be dedicated servers meant to store and execute certain business applications built based on the on-demand platform using the on-demand platform technology and on-demand platform business content. In some instances, the backend servers 102, 120 may include a web server or be communicably coupled with a web server, where one or more of the business applications associated with the backend servers 102, 120 represent web-based (or web-accessible) applications accessed and executed through requests and interactions received on the front-end client 150a-b operable to interact with the programmed tasks or operations of the corresponding on-demand platform and/or business applications.

At a high level, the backend servers 102, 120 include an electronic computing device operable to receive, transmit, process, store, or manage data and information associated with the environment 100. The backend servers 102, 120 illustrated in FIG. 1 can be responsible for receiving requests from one or more front-end clients 150a-b (as well as any other entity or system interacting with the backend servers 102, 120, including desktop or mobile client systems), responding to the received requests by processing said requests in an on-demand platform and/or an associated business application, and sending the appropriate responses from the appropriate component back to the requesting front-end client 150a-b or other requesting system. Components of the backend servers 102, 120 can also process and respond to local requests from a user locally accessing the backend servers 102, 120. Accordingly, in addition to requests from the front-end client 150a-b illustrated in FIG. 1, requests associated with a particular component may also be sent from internal users, external or third-party customers, and other associated business applications, business processes, as well as any other appropriate entities, individuals, systems, or computers. In some instances, either or both an on-demand platform and/or a business application may be web-based applications executing functionality associated with a networked or cloud-based business process.

As used in the present disclosure, the term "computer" is intended to encompass any suitable processing device. For example, although FIG. 1 illustrates three backend servers 102, 120, environment 100 can be implemented using any number of servers, as well as computers other than servers, including a server pool. Indeed, the backend servers 102, 120 may be any computer or processing device such as, for example, a blade server, general-purpose personal computer (PC), Macintosh®, workstation, UNIX®-based workstation, or any other suitable device. In other words, the present disclosure contemplates computers other than general purpose computers, as well as computers without conventional operating systems. Further, the illustrated backend servers 102, 120 may be adapted to execute any operating system, including Linux®, UNIX®, Windows®, Mac OS®, or any other suitable operating system.

The first backend server 102 is illustrated in details in FIG. 1. The first backend server 102 includes an interface 104, a processor 106, a memory 110, a business application 108, and other components further illustrated in FIG. 2. In some instances, the backend servers 102, 120 and its illustrated components may be separated into multiple components executing at different servers and/or systems. For example, while FIG. 1 illustrates the business application 108 and the processor 106 as separate components, other example implementations can include the processor 106 within a separate system, as well as within as part of the business application's inherent functionality. Thus, while illustrated as a single component in the example environment 100 of FIG. 1, alternative implementations may illustrate the backend servers 102, 120 as comprising multiple parts or portions accordingly.

FIG. 1 depicts a server-client environment, but could also represent a cloud computing network. Various other implementations of the illustrated environment 100 can be provided to allow for increased flexibility in the underlying system, including multiple business network coordinator systems performing or executing one or more additional or alternative instances of networked applications and associated with a business application 108 for one or more different platforms, as well as multiple instances of the business application 108 and its related functionality. In those instances, the different backend servers 102, 120 may communicate with each other via a cloud-based network or through the connections provided by network 140.

In FIG. 1, the interface 104 is used by the first backend server 102 to communicate with other systems in a client-server or other distributed environment (including within environment 100) connected to the network 140 (e.g., one of the front-end clients 150a-b, as well as other clients or backend servers communicably coupled to the network 140). The term "interface" 104, 178a-c generally includes logic encoded software and/or hardware in a suitable combination and operable to communicate with the network 140. More specifically, the interface 104 may comprise software supporting one or more communication protocols associated with communications such that the network 140 or the interface's hardware is operable to communicate physical signals within and outside of the illustrated environment 100. Generally, the backend servers 102, 120 may be communicably coupled with a network 140 that facilitates wireless or wireline communications between the components of the environment 100 (i.e., among the backend servers 102, 120 and/or one or more front-end clients 150a-b), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the components associated with the backend servers 102, 120 may be included within the network 140 as one or more cloud-based services or operations.

The term "network" refers to all or a portion of an enterprise or secured network, while in another instance, at least a portion of the network 140 may represent a connection to the Internet. In the illustrated example, at least a portion of the network 140 includes a portion of a cellular or mobile data network or other network capable of relaying SMS messages. In some instances, a portion of the network 140 may be a virtual private network (VPN). Further, all or a portion of the network 140 can include either a wireline or wireless link. Example wireless links may include 802.11a/b/g/n, 802.20, WiMax®, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the first backend server 102 includes a processor 106. Although illustrated as a single processor 106 in the backend server 102, two or more processors may be used in the backend server 102 according to particular needs, desires, or particular embodiments of environment 200. The backend servers 120 and 102, as well as other backend systems, may similarly include one or more processors. The term "processor" refers to a central processing unit (CPU), a blade, an application specific integrated circuit (ASIC), a field-programmable gate array (FPGA), or another suitable component. Generally, the processor 106 executes instructions and manipulates data to perform the operations of the backend server 102, and, specifically, the functionality associated with the corresponding business application 108. In one implementation, the server's processor 106 executes the functionality required to receive and respond to requests and instructions from the front-end client 150*a-b*, as well as the functionality required to perform the operations of the associated business application 108 and an on-demand platform, among others.

At a high level, the term "business application" and "networked application" described in this specification refer to any application, program, module, process, or other software that may execute, change, delete, generate, or otherwise manage information associated with the backend server 102 or the client device 150*a-b*, and in some cases, a business process performing and executing business process-related events. In particular, business processes communicate with other users, applications, systems, and components to send, receive, and process events. In some instances, a particular business application 108 may operate in response to and in connection with one or more requests received from an associated client or other remote client. Additionally, a particular business application 108 may operate in response to and in connection with one or more requests received from other business applications external to the backend server 102. In some instances, the business application 108 can be a networked application, for example, the business application 108 is built on a common platform with one or more applications in either or both of the backend servers 120 and 102. In some instances, the business application 108 may request additional processing or information from an external system or application. In some instances, each business application 108 may represent a web-based application accessed and executed by the front-end client 150*a-b* via the network 140 (e.g., through the Internet, or via one or more cloud-based services associated with the business application 108).

Further, while illustrated as internal to the backend server 102, one or more processes associated with a particular business application 108 may be stored, referenced, or executed remotely. For example, a portion of a particular business application 108 may be a web service that is remotely called, while another portion of the business application 108 may be an interface object or agent bundled for processing at a remote system (not illustrated). Moreover, any or all of a particular business application 108 may be a child or sub-module of another software module or enterprise application (e.g., the backend servers 120 and 130) without departing from the scope of this disclosure. Still further, portions of the particular business application 108 may be executed or accessed by a user working directly at the backend servers 102, as well as remotely at corresponding front-end client 150*a-b*.

Regardless of the particular implementation, "application" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java®, Visual Basic®, assembler, Perl®, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, the processor 106 executes the corresponding business application 108 stored on the associated backend servers 120. In some instances, a particular backend server may be associated with the execution of two or more business applications (and other related components), as well as one or more distributed applications executing across two or more servers executing the functionality associated with the backend servers.

FIG. 1 further includes memory 110 in the backend server 102. For example, the backend server 102 can host a master application for a particular data object, which is stored at the memory 110. The data object stored at the memory 110 may be accessed by other networked applications, for example, by applications of the backend servers 120 and 102. The data access does not require data replication and therefore can be stored at a single location (i.e., the memory 110). In addition, the memory 110 of the backend server 120 stores data and program instructions for the business application 108. The term "memory" refers to any memory or database module and may take the form of volatile or non-volatile memory including, without limitation, magnetic media, optical media, random access memory (RAM), read-only memory (ROM), removable media, or any other suitable local or remote memory component.

The memory 110 may store various objects, object models, and data, including classes, frameworks, applications, backup data, business objects, jobs, web pages, web page templates, database tables, process contexts, repositories storing services local to the backend server 120 and any other appropriate information including any parameters, variables, algorithms, instructions, rules, constraints, or references thereto associated with the purposes of the backend server 120 and its functionality. In some implementations, including in a cloud-based system, some or all of the memory 110 may be stored remote from the backend server 120 and communicably coupled to the backend server 120 for usage. As described above, memory 110 can include one or more meta-models associated with various objects included in or associated with the underlying platform. Specifically, memory 110 can store items and entities related to the business application 108 and/or other collaboration-related entities or components. Some or all of the elements illustrated within memory 110 may be stored external to the memory 110. These items may be made accessible to the business application 108 as illustrated in FIG. 2.

As used in this disclosure, in FIG. 1, the front-end client 150*a-b* is intended to encompass a personal computer, touch screen terminal, workstation, network computer, kiosk, wireless data port, smart phone, personal data assistant (PDA), one or more processors within these or other devices, or any other suitable processing device. For example, the front-end client 150*a-b* may comprise a computer that includes an input device, such as a keypad, touch screen, mouse, or other device that can accept user information, and an output device that conveys information associated with the operation of one or more business applications, on-demand platforms, and/or the front-end client 150*a-b* itself, including digital data, visual information, or GUI. Both the input and output device may include fixed or removable storage media such as a magnetic storage media, CD-ROM, or other suitable media, to both receive input from and provide output to users of front-end client 150*a-b* through the display, namely, the GUI. The clients' processors, interfaces, and memories may be similar to or different from those described in connection with the other components illustrated in FIG. 1, although alternative implementations of one or more of these components may be used, as well as implementations where additional components may also be included.

Figure 2:
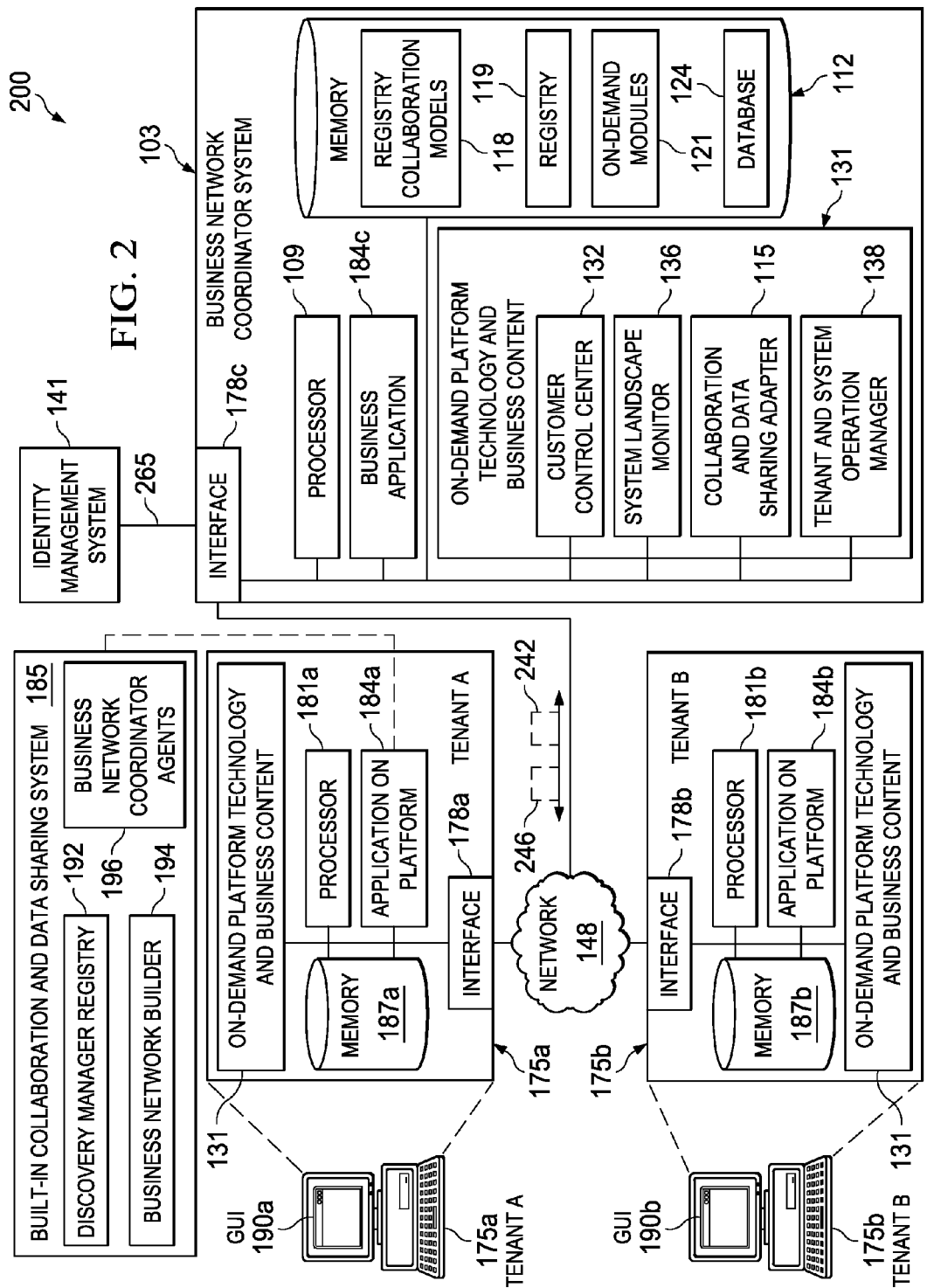
FIG. 2 illustrates an example environment for implementing various features of a system for sharing data across networked applications FIG. 3 describes an exemplary network environment for adoption of an extension of a service across networked applications.

FIG. 2 illustrates an example environment 200 for implementing various features of a system for establishing a business network using shared platform. The illustrated environment 200 includes, or is communicably coupled with, a business network coordinator system 103 which takes a coordinator role in a cloud-computing environment and at least two tenants: tenant A 175a and tenant B 175b. In some instances, the tenants 175a, 175b may co-reside on a single server or system, as appropriate, or may each be one of the front-end clients 150a-b illustrated in FIG. 1. At least some of the communications between the business network coordinator system 103 and the tenants A 175a and B 175b may be performed across or via network 148. In general, environment 200 depicts an example configuration of a system for establishing business networks using applications built on a shared platform in a cloud computing environment, such as environment 200. The illustrated system includes development technology and hosted and managed services and applications built on top of the underlying platform technology. The business network coordinator system 103 represents a dedicated and/or ad hoc system built using the platform technology for coordinating collaboration with other systems associated with and executing on platform-related technology. The coordinating system is used to manage and operate the system and tenants belonging to the cloud computing environment, providing knowledge of and connections to the various systems, clients, and tenants therein. The business network coordinator system 103 is enhanced to support data sharing and collaboration capabilities. As illustrated, tenant A 175a and tenant B 175b can access certain business applications on the similar, or common, on-demand platform providing SaaS solutions. Tenant A 175a may provide information regarding data or other collaboration information created by or associated with itself to be shared with other users or systems to the business network coordinator system 103, with at least a portion of that data being published in a collaboration-related registry 119 for searching, viewing, and identifying the data by tenant B 175b and/or other tenants using the common platform. Tenant B 175b may invite tenant A 175a to establish a business network based on the shared information associated with tenant A 175a, as well as based on a business or social relationship between them. The environment 200 is an example and, in alternative implementations, the elements illustrated in FIG. 2 may be included in or associated with different and/or additional servers, clients, networks, and locations other than those as shown. For example, one or more of the components illustrated within the business network coordinator system 103 may be located in multiple or different servers, cloud-based or cloud computing networks, or other locations accessible to the business network coordinator system 103 (e.g., either directly or indirectly via network 148).

In general, the business network coordinator system 103 is any server or system that stores, manages, and executes functionality associated with an on-demand platform, including assisting in the establishing ad hoc collaboration business networks between two or more users or entities executing applications based on a common platform. In some instances, the business network coordinator system 103 may execute one or more business applications 120. For example, each business network coordinator system 103 may be one of the backend servers 102, 120 and 130 illustrated in FIG. 1. In some instances, each business network coordinator system 103 may store a plurality of various applications, while in other instances, business network coordinator systems 103 may be dedicated servers meant to store and execute the business applications 184c, which is built based on the on-demand platform technology and business content 131 ("on-demand platform") using the on-demand platform technology and on-demand platform business content. The coordinator, or central, system 103 may be one or more dedicated servers for managing all systems/tenants that are part of a cloud computing environment. In some instances, the business network coordinator system 103 may comprise a web server or be communicably coupled with a web server, where one or more of the business applications 184c associated with the business network coordinator system 103 represent web-based (or web-accessible) applications accessed and executed through requests and interactions received on the tenants A 175a and B 175b (i.e., via application on platform 184a-b) operable to interact with the programmed tasks or operations of the corresponding on-demand platform 131 and/or business applications 184c.

The business network coordinator system 103 illustrated in FIG. 2 can be responsible for receiving application requests from one or more tenants A 175a and B 175b (as well as any other entity or system interacting with the business network coordinator system 103, including desktop or mobile client systems), responding to the received requests by processing said requests in the on-demand platform 131 and/or the associated business application 184c, and sending the appropriate responses from the appropriate component back to the requesting tenants A 175a and B 175b or other requesting system. The business network coordinator system 103 may perform a central landscape server's functionality, e.g. the functionality of the cloud solutions landscape directory 307, 400 described in context of FIGS. 3 and 4. Such functionality may comprise storing data packages associated with service extensions, making available the data packages to various platforms that are based on various technologies, and monitoring the network landscape by the system landscape monitor 136, 430.

Components of the business network coordinator system 103 can also process and respond to local requests from a user locally accessing the business network coordinator system 103. Accordingly, in addition to requests from the tenants A 175a and B 175b illustrated in FIG. 2, requests associated with a particular component may also be sent from internal users, external or third-party customers, and other associated business applications, business processes, as well as any other appropriate entities, individuals, systems, or computers. In some instances, either or both of the on-demand platform 131 and/or the business application 184c may be web-based applications executing functionality associated with a networked or cloud-based business process.

In the illustrated implementation of FIG. 2, the business network coordinator system 103 includes an interface 106, a processor 109, a memory 112, a business application 184c, and the on-demand platform 131. In some instances, the business network coordinator system 103 and its illustrated components may be separated into multiple components executing at different servers and/or systems. For example, while FIG. 2 illustrates the business application 184c and the on-demand platform 131 as separate components, other example implementations can include the on-demand platform 131 within a separate system, as well as within as part of the business application's inherent functionality. Thus, while illustrated as a single component in the example environment 200 of FIG. 2, alternative implementations may illustrate the business network coordinator system 103 as comprising multiple parts or portions accordingly.

FIG. 2 depicts a server-tenant environment, but could also represent a cloud computing network. Various other implementations of the illustrated environment 200 can be provided to allow for increased flexibility in the underlying system, including multiple business network coordinator systems 103 performing or executing one or more additional or alternative instances of the on-demand platform 131 and associated with a business application 184c for one or more different platforms, as well as multiple instances of the business application 184c and its related functionality. In those instances, the different business network coordinator systems 103 may communicate with each other via a cloud-based network or through the connections provided by network 148.

As illustrated in FIG. 2, the interface 106 enables an identity management system 141 to connect with the business network coordinator system 103 via a registry connection 265. The identity management system 141 may be used to identify users (e.g., tenants A or B) to whom access to shared data is granted when they access shared data across systems or tenants. The usage of one or more identity management systems provides support for single sign-on services to be supported, avoiding a need for users to re-authenticate when they access shared data on other tenants. To avoid re-authentication, the identity management system 141 can provide the required user mapping. The business network coordinator system 103 may further include registry collaboration models 118 and on-demand modules 121.

The identity management system 141 can identify and manage users (related to particular tenants) in a system (such as a country, a network, or an organization) and control access to the resources in that system by placing restrictions on the established identities of the tenants. The identity management system 141 can be multidisciplinary and covers many dimensions, such as technical, legal, security and organizational dimensions. In some implementations, an identity can be constructed from a small set of axiomatic principles. For example, all identities in a given abstract namespace may be unique and distinctive, and/or such identities can bear a specific relationship to corresponding entities in the real world. An axiomatic model of this kind can be considered to express "pure identity" in the sense that the model is not constrained by the context in which it is applied. In general, an entity and/or user can have multiple identities, and each identity can consist of multiple attributes or identifiers, some of which are shared and some of which are unique within a given name space. The identity management system 141 can perform and/or support user mapping to the same identity, removing a need to re-authenticate uses when the same identity attempts access over a particular tenant or system, such as when accessing collaboration data on different systems. In some instances, the identity management system 141 may be communicably coupled to the business network coordinator system 103 via network 148.

Generally, the business network coordinator system 103 may be communicably coupled with a network 148 that facilitates wireless or wireline communications between the components of the environment 200 (i.e., between the business network coordinator system 103 and/or one or more tenants A 175a and B 175b), as well as with any other local or remote computer, such as additional clients, servers, or other devices communicably coupled to network 148, including those not illustrated in FIG. 2

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 200, each processor 109 executes the corresponding on-demand platform 131 and the business application 148c stored on the associated business network coordinator system 103. In some instances, a particular business network coordinator system 103 may be associated with the execution of two or more business applications 184c (and other related components), as well as one or more distributed applications executing across two or more servers executing the functionality associated with the business network coordinator system 103.

Further, while illustrated as internal to the business network coordinator system 103, one or more processes associated with a particular business application 184c may be stored, referenced, or executed remotely. For example, a portion of a particular business application 184c may be a web service that is remotely called, while another portion of the business application 184c may be an interface object or agent bundled for processing at a remote system (not illustrated) or a particular tenant A 175a or B 175b (e.g., the application on platform 184a-b). Moreover, any or all of a particular business application 120 may be a child or sub-module of another software module or enterprise application (not illustrated) without departing from the scope of this disclosure. Still further, portions of the particular business application 184c may be executed or accessed by a user working directly at the business network coordinator system 103, as well as remotely at corresponding tenants A 175a and B 175b.

The illustrated business application 184a-c may be created and developed based on an underlying software platform or platform layer, which can be used to provide functionality defined by the platform, as well as additional functionality available by building software applications upon the platform layer using components and entities designed or adapted for use with the platform. By creating the additional functionality, the platform can be extended and added to by a plurality of developers, providing for a fluid means of enhancement. In an aspect, the business application 184a-c are enhanced by a networked applications extension manager (NAEM) 311, as described below in context of FIG. 3, that is a processing device that manages extension of services across the business applications 184a-c. In an aspect, the NAEM 311 provides a harmonization-means for different extensibility mechanisms of services in the different business applications and may rely on capabilities and features of the business network coordination system 103 (e.g. cloud solution landscape directory 307 in a cloud-computing environment) to propagate the extensions easily to the different business applications 184a-c that may be communicatively coupled in the network 148. In an implementation, the NAEM may comprise a platform-specific extensibility adapter 310 for creating the data package associated with the service extension, a connectivity manager 309 for announcing and discovering that a service extension was created, and a platform-specific extension injector 308 for implementing the service extension in a business application 184a-c, as described below in context of FIG. 3.

In some instances, additional applications can be built on top of the original system by many different developers and development teams to create new products and software. The on-demand platform 131 and its corresponding consolidated on-demand platform can maintain a metadata repository storing information on the various models and their associated definitions and metadata across an entire development eco-system, while the on-demand platform 131 may be used on which to create or to base newly developed applications.

The on-demand platform 131 may include multiple components of functionality, including those illustrated in example FIG. 2. For example, the on-demand platform 131 of FIG. 2 includes three components, a customer control center 132, a system landscape monitor 136, and a tenant and system operation manager 138. In general, the customer control center 132 provides one or more application programming interfaces (APIs) to the tenants A 175a and B 175b for accessing the operations of the on-demand platform 131 remotely. In some instances, use of one or more APIs at the Customer control center 132 can allow for pre-publishing of one or more models to and/or from the business network coordinator system 103 of FIG. 2.

The customer control center 132 allows tenants, such as the tenants A 175a and B 175b, access to the on-demand platform 131, and vice versa. The customer control center 132 may include a graphical user interface for selection of administration tools. For example, the tenants may monitor system health, retrieve system information, execute maintenance program, analyze system performance, improve execution procedure, organize files and information, and perform other control tasks via the customer control center 132. In some aspects, the customer control center 132 enables collaboration functionalities when tenants, such as the tenants A 175a and B 175b, access and operate on the on-demand platform 131 via the customer control center 132.

The system landscape monitor 136 can monitor operations, modules, and activities of the business network coordinator system 103, as well as those systems associated with the business network coordinator system 103, including the tenants 175a, b and other systems and applications. The system landscape monitor 136 may be accessed by tenants such as the tenants A 175a and B 175b to access the published registry data and collaboration content. Further details regarding the communication between the system landscape monitor 136 and the tenants will be descried in detail in FIG. 1B. In some implementations, the system landscape monitor 136 can collect and present a list of active tenants using the on-demand platform 131. The system landscape monitor 136 may categorize the active tenants by areas of business, technology, market orientation, and other aspects of the tenants. In some implementations, the system landscape monitor 136 can show resource distribution or allocation or both within the business network coordinator system 103 and enable administrators or tenants with administrator rights to modify and improve the resource distribution or allocation or both.

The tenant and system operation manager 138 supports communications between tenants, such as tenants A 175a and B 175b and the business network coordinator system 103. The tenant and system operation manager 138 can manage central instances of network establishments between tenants and enable the business network coordinator system 103 to monitor the network upon establishment agreement from all participants. For example, tenant A 175a may publish certain data to the business network coordinator system 103. Tenant B 175b may receive the published data registry and send an invitation, or request that an invitation be sent, to the tenant A 175a to establish a business network. The tenant and system operation manager 138 enables these operations performed by the tenants A 175a and B 175b. If tenant A 175a accepts the invitation from tenant B 175b, then a business network can be established between tenant A 175a and tenant B 175b.

FIG. 2 further includes memory 112. The memory 112 of the business network coordinator system 103 stores data and program instructions, as well as metadata associated with the on-demand platform 131 In some implementations, including in a cloud-based system, some or all of the memory 112 may be stored remote from the business network coordinator system 103, and communicably coupled to the business network coordinator system 103 for usage. As described above, memory 112 can include one or more meta-models associated with various objects included in or associated with the underlying platform. Specifically, memory 112 can store items and entities related to the on-demand platform 131 and/or other collaboration-related entities or components. Some or all of the elements illustrated within memory 112 may be stored external to the memory 112. These items may be made accessible to the on-demand platform 131.

The memory 112 includes several components associated with a collaboration and data sharing adapter 115 (illustrated external to memory 112), which includes registry collaboration models 118, registry 119, on-demand modules 121, and database 124. The collaboration and data sharing adapter 115 enables tenants to publish and search shared registry data. For example, the tenants using the shared on-demand platform 131 have access to the embedded functionality for collaboration, data-sharing and network establishment. The tenants that are willing to participate in network establishment can select so and automatically publish their data via the registry collaboration models 118 in the collaboration and data sharing adapter 115. When some tenants search for collaboration partners, they can send or receive invitation for data sharing and collaboration by other tenants. The registry collaboration models 118 identify the tenants that agree to a business network establishing relationship.

The on-demand modules 121 in the memory 112 may include various functionalities of the business network coordinator system 103, and can be selectively provided to some or all of the tenants. As previously described, the on-demand modules 121 in the business network coordinator system 103 may include CRM, FM, PM, SCM, SRM, HRM, EMS, CM, and others. For example, tenant A 175a may request services of a subset of the on-demand modules 121 from the application on platform 184a, such as CRM, HRM, and EMS. Tenant B 175b may request a different subset of the on-demand modules 121 on the application platform 184b, such as FM, HRM, and EMS.

The shared data created by both the tenants A 175a and B 175b can be stored at the database 124, while the on-demand modules 121 remain standard to the on-demand platform 131. As part of SaaS, the database 124 may provide secure, efficient and reliable performance to the tenants. The tenants may specify a certain portion of data to be published in the registry and shared in the business network coordinator system 103. The registry collaboration models 118, the on-demand modules 121 and the database 124 enable the collaboration and data sharing adapter 115 to supply a frame work for different tenants to publish and search data as well as establish tenant-to-tenant network, without requirement of a central website or server.

The illustrated environment 200 of FIG. 2 also includes one or more tenants A 175a and B 175b, e.g., one or more of the front-end clients 150a-b illustrated in FIG. 1. The tenants A 175a and B 175b may be associated with a particular business application 108, 184 or development context, as well as a particular platform-based application system. Each tenant A 175a and B 175b may be any computing device operable to connect to or communicate with at least one of the business network coordinator system 103 using a wireline or wireless connection via the network 148, or another suitable communication means or channel. In some instances, the tenants A 175a and B 175b may be a part of or associated with a business process involving one or more of the business applications 184c, or alternatively, a remote developer of associated with the platform or a related platform-based application. In general, each tenant A 175a and B 175b includes a processor 181a-b, an interface 178a-b, an application on platform 184a-b, a graphical user interface (GUI) 190a-b, and a memory 187a-b. In some instances, tenants A 175a and B 175b may be located on a single server in a co-tenancy environment. In those instances, the tenants 175a, b may share some or all of the resources of the server to perform their corresponding operations. In general, the tenants A 175a and B 175b comprise electronic computer devices operable to receive, transmit, process, and store any appropriate data associated with the environment 200 of FIG. 2. It will be understood that there may be any number of tenants A 175a and B 175b associated with, or external to, environment 200. For example, while illustrated environment 200 includes two tenants A 175a and B 175b, alternative implementations of environment 200 may include multiple tenants communicably coupled to the one or more of the systems illustrated. In some instances, one or more tenants A 175a and B 175b may be associated with administrators of the environment, and may be capable of accessing and interacting with the settings and operations of the on-demand platform 131, one or more business applications 184c, a particular application development module, and/or other components of the illustrated environment 200. Additionally, there may also be one or more additional tenants A 175a and B 175b external to the illustrated portion of environment 200 capable of interacting with the environment 200 via the network 148. Further, the terms "tenant," "client," "customer," and "user" may be used interchangeably as appropriate without departing from the scope of this disclosure. Moreover, while each tenant A 175a and B 175b is described in terms of being used by a single user, this disclosure contemplates that many users may use one computer, or that one user may use multiple computers. In general, tenants may usually belong to one customer or company. Several employees of the customer, called users, can use the applications deployed on the corresponding tenant. For instance, the term "tenant" refers to a system providing a set of business applications belonging to or rented by a particular customer or business entity. Several employees of that particular customer or business entity can be users of that tenant and use the business applications provided by or available on this tenant.

The GUIs 190a-b associated with each tenant A 175a and B 175b may comprise a graphical user interface operable to, for example, allow the user of a tenants A 175a and B 175b to interface with at least a portion of the business application 184c, the on-demand platform 131, and their associated operations and functionality. Generally, the GUI 190a-b provides the particular user with an efficient and user-friendly presentation of business data provided by or communicated within the system. The GUI 190a-b may comprise a plurality of customizable frames or views having interactive fields, pull-down lists, and buttons operated by the user. For example, the GUI 190a-b may provide interactive elements that allow a user to interact with a particular component within and/or external to environment 200. Different portions of the corresponding component's functionality may be presented and accessible to the user through the GUI 190a-b, such as through an application on platform 184a-b (e.g., a web browser). Generally, the GUI 190a-b may also provide general interactive elements that allow a user to access and utilize various services and functions of a particular component. In some instances, the application on platform 184a-b may be used to access various portions of different platform-based application systems or the business network coordinator system 103. In some instances, the application on platform 184a-b may be an agent or client-side version of the business application 184c or other suitable component. The GUI 190a-b may present the information of the application on platform 184a-b for viewing and interaction. In general, the GUI 190a-b is often configurable, supports a combination of tables and graphs (bar, line, pie, status dials, etc.), and is able to build real-time portals, where tabs are delineated by key characteristics (e.g., site or micro-site). Therefore, the GUI 190a-b contemplates any suitable graphical user interface, such as a combination of a generic web browser, intelligent engine, and command line interface (CLI) that processes information in the platform and efficiently presents the results to the user visually.

As used in this disclosure, each tenant A 175a and B 175b is intended to encompass a personal computer, touch screen terminal, workstation, network computer, kiosk, wireless data port, smart phone, personal data assistant (PDA), one or more processors within these or other devices, or any other suitable processing device. For example, each tenant A 175a and B 175b may comprise a computer that includes an input device, such as a keypad, touch screen, mouse, or other device that can accept user information, and an output device that conveys information associated with the operation of one or more business applications 184c, on-demand platforms 131, and/or the tenants A 175a and B 175b itself, including digital data, visual information, or the GUI 190a-b. Both the input and output device may include fixed or removable storage media such as a magnetic storage media, CD-ROM, or other suitable media, to both receive input from and provide output to users of tenants A 175a and B 175b through the display, namely, the GUI 190a-b. The tenants' processors 181a-b, interfaces 178a-b, and memories 187a-b may be similar to or different from those described in connection with the other components illustrated in FIG. 2, although alternative implementations of one or more of these components may be used, as well as implementations where additional components may also be included.

The applications on platform 184a-b may comprise applications based on the common platform for coordinating the described business network. As illustrated in FIG. 2, tenants A 175a and B 175b respectively contain a built-in collaboration and data sharing system, for example, the built-in collaboration and data sharing system 185 of tenant A 175a. The built-in collaboration and data sharing system 185 may further include components such as a discovery manager registry 192, a business network builder 194, and business network coordinator agents 196. The discovery manager registry 192 enables tenant A 175a to find available shared data in the registry. The business network builder 194 enables the tenant A 175a to establish a business network after the tenant A 175a discovers useful shared data. For example, the discovery manager registry 192 may access published shared data in the business network coordinator system 103.

In some instances, the discovery manager registry 192 may actually collect published shared data and/or metadata describing a set of shared data for inspection at the corresponding tenant, allowing each tenant to view the set of information available for sharing and collaboration. In an aspect, the discovery manager registry 192 may perform operations of checking other platforms, including a central repository, for additional service extensions to be associated with their own applications. Tenant A 175*a* can send invitations via the business network builder 194 to other tenants of which the shared data are discovered by the tenant A 175*a*. If the invited tenant accepts the invitation, a business network between the two tenants can then be established. The business network coordinator agents 196 can enables various components to work with central collaboration capabilities to allow for sharing. The Although in FIG. 2 only one built-in collaboration and data sharing system is shown, in some instances, every tenant may include an application based on the on-demand platform having a built-in collaboration and data sharing system.

In FIG. 2, the example system 200 may include the tenants A 175*a* and B 175*b* of the example environment 200. The tenants A 175*a* and B 175*b* are using business applications 210 based on the on-demand platform, such as the on-demand platform 131 of the business network coordinator system 103 in FIG. 2. In some implementations, the business applications 184*a-b* can include multiple functionalities and modules. For example, the business applications 210 may include CRM, FM, PM, SCM, SRM, HRM, EMS, CM, and others.

Each of the tenants A 175*a* and B 175*b* includes a business application on platform 184*a* and 184*b*. The business application on platform 184*a* and 224 can be realized on a web browser running on a remote computer. As an end user of an SaaS, the tenants A 175*a* and B 175*b* can access various modules of the business applications 184*a-b* without previous local installation of the business applications 184*a-b*, as components of the business application on platforms 184*a* or 184*b* can be downloaded based on the demand of the tenant A 175*a* and B 175*b*. The business application on platforms 184*a* and 224, as illustrated, include built-in collaboration and data sharing 185. The built-in collaboration and data sharing 185 locally determines data publication and discovery in the tenants A 175*a* and B 175*b*. For example, tenant A 175*a* may access a registry (as illustrated by 242) across a network boundary to communicate registry data and collaboration content. The registry data and collaboration content may reach the business network coordinator system 103. The business network coordinator system 250 may include several components to manage the registry data and collaboration content.

In some implementations, the business network coordinator system 103 may include a customer control center 132, a system landscape monitoring 136, a tenant and system operations manager 138, and a collaboration and data sharing adapter 115. The tenant A 175*a* can publish and share some data with the tenant B 175*b* by providing certain access to the shared data via the business network coordinator system 103. The access can be provided via different channels and entities provided by the platform, for example, a user interface view, web services, core services of business object, report, etc. The tenant B 175*b* can be connected to the business network coordinator system 103 as a potential collaboration partner. The exact released and accessible data are defined and controlled via a user authorization mechanism provided via the on-demand platform on which the business applications 184*a-b* are based. The business network coordinator system 103 may include the on-demand platform. For example, a user of the tenant B 175*b* can be provided access to at least a portion of the information stored at and owned by tenant A once a business network of data sharing is established between tenant A 175*a* and tenant B 175*b*. A functional- and instance-based authorization module, which is part of the on demand platform 131, can ensure that users can access only the data published as shared data, where the particular user is authorized to view the shared data. The shared data and services can be managed centrally via the collaboration and data sharing work center provided in the business applications 184*a-b*.

In some implementations, tenants using an on-demand platform can access an on-demand platform registry, which can show other tenants that are using the same on-demand platform and have agreed to publish certain information in the on-demand platform business network that is supported by the business network coordinator system 103. The tenants can use standard search and browsing functions and retrieve header information entered by the tenants as they publish the information in the on-demand platform registry. For example, tenant A 175*a* publishes registry data (as illustrated by 242), where the registry data is managed by the business network coordinator system 103. The collaboration and data sharing adapter 115 of the business network coordinator system 103 can allow tenants to send explicit invitation for collaboration or data-sharing to one or several other tenants founded in the registry. If invited tenants accept the invitation, a relationship between both tenants can be established and both tenants can be shown as collaboration partners. For example, the business network coordinator system 103 may replicate metadata models and propagate authorizations (as illustrated by 246) that connect to tenant B 175*b*. In some instances, metadata models provided to the business network coordinator system 103 can be replicated to at least a portion of the built-in collaboration and data sharing systems 185, such that those systems have relevant information on the data and information shared by the other users/entities/applications related to potential collaboration. The tenants A 175*a* and B 175*b* can form a business network via the business network coordinator system 103.

Until the business network is established via the business network coordinator system 103, the collaborating tenants may not access each other's data or share information except, in some instances, standard header information entered in the on-demand platform registry and published by the tenants. The on-demand platform registry can have access to the data collected by the business network coordinator system 103 that performs as a central component to allow monitoring and administration operations associated with connected tenants.

Figure 3:
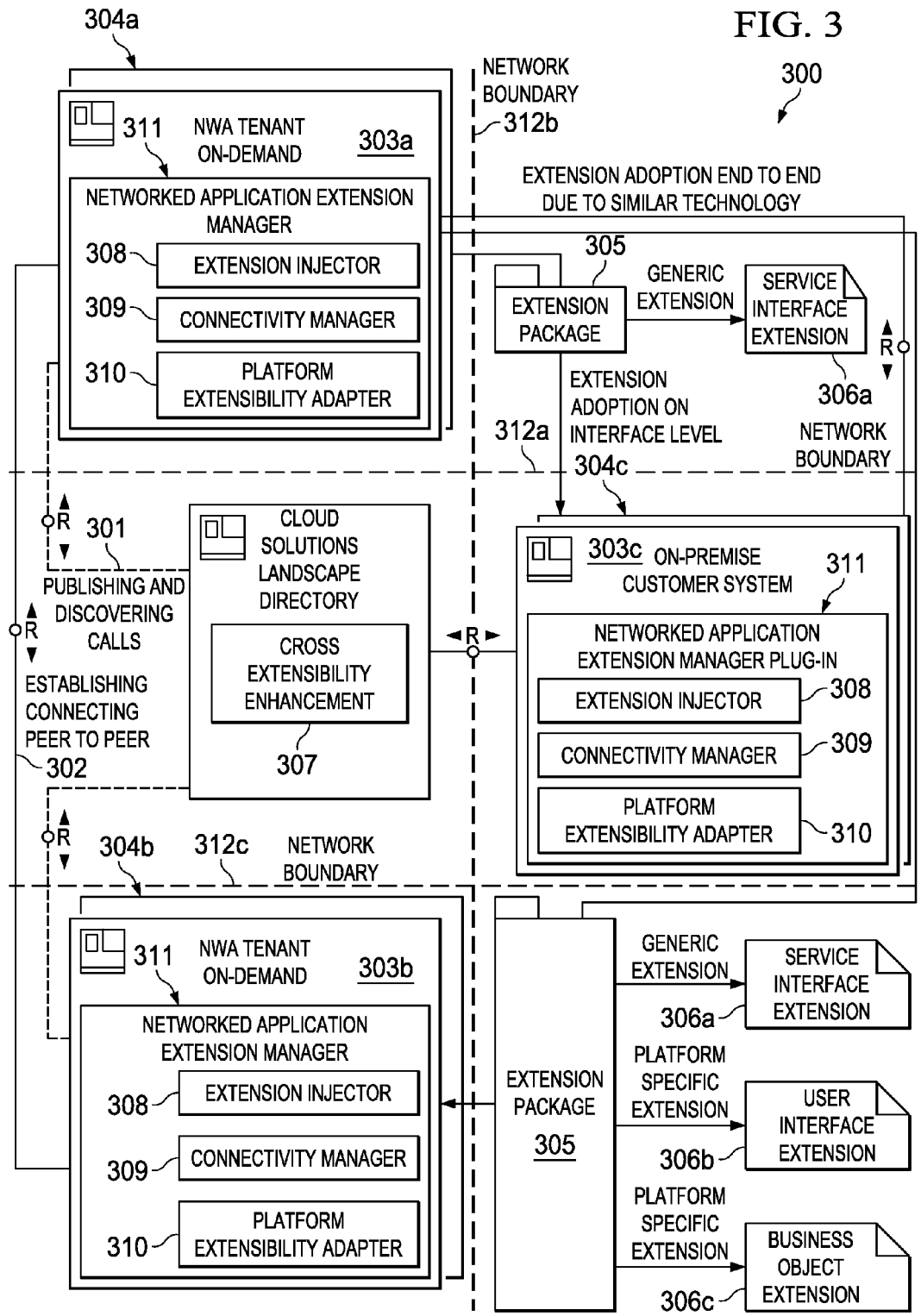

FIG. 3 describes an exemplary network environment 300 comprising platforms 304*a-c* operating networked applications 303*a-c*, cloud-computing environment 307 and/or peer-to-peer network connections 302 associated to the networked applications 303*a-c* operated by the platforms 304*a-c* (e.g., tenant, client or back-end servers as described in FIGS. 1, 2 and 3). The network environment may be segmented into multiple networks that are electronically and/or physically separated by network boundaries 312*a-c*. In an aspect, each of the platforms 304*a-c* may be separated by one or more network boundaries 312*a-c* from the remaining platforms 304*a-c* and/or the cloud-computing environment (e.g., from a cloud solution landscape directory 307).

In a general aspect, the networked applications are enhanced by a networked applications extension manager (NAEM) 311 that manages extension of services across the networked applications. In an aspect, the NAEM 311 provides a harmonization-means for different extensibility mechanisms of services in the different networked applications and may rely on capabilities and features of cloud-computing environments, e.g. cloud solution landscape directory 307 (e.g., business network coordination system in FIG. 2), to propagate the extensions easily to the different networked applications 303a-c.

In a general aspect, the environment 300 comprises one or more computers in the platforms 304a-c and a computer-readable medium (e.g. memory illustrated in FIGS. 1, 2) coupled to the one or more computers having instructions stored thereon which, when executed by the one or more computers, cause the one or more computers to perform operations for adoption of at least one extension 306a-c of a service (e.g., a functionality or attribute associated with service interface, business logic, business object or user interface within a networked application) across the networked applications, the operations comprising: creating, by a source networked application 303a (e.g., by an extension adapter 310 interfacing with an extension tool of the source networked application 303a-c) operated by a source platform 304a (e.g., tenant, client or back-end servers as described in FIGS. 1, 2), a data package 305 associated with the extension, the data package 305 comprising data 306 specifying the service to be extended and/or information (e.g, header information) associated with a technology on which the source platform is based on, wherein the data and the information of the data package may be arranged in a data structure configured to be propagated 301, 302 across the networked applications, the networked applications comprising the source networked application 303a and at least one target networked applications 303b-c, and wherein the source networked application is communicatively coupled 301, 302 to the at least one target networked applications 303b-c or to a cloud solution directory 307 (e.g., business network coordination system in FIG. 2). In an aspect, the data package is configured to be propagated across the networked applications 303a-c and either via the cloud solutions landscape directory 301, 307 or via peer-to-peer network connections 302 within the network environment 300.

In an aspect, the operations for adoption of an extension 306a-c of a service across the networked applications 303a-c further comprise collecting or creating the data by the source networked application, and collecting or creating the information specifying the technology of the source platform. For example, the header information may be text or markup language.

In an aspect, the header information may describe the technology of the source platform 304a and/or the source networked application 303a. In an aspect, the data in the data package 305 may be written in Extensible Markup Language (XML).

In an aspect, the operations for adoption of an extension 306a-c of a service across the networked applications 303a-c further comprise arranging at least a portion of the data of the data package 305 in a data structure configured to be implemented in the service within the target networked application 303b-c by extracting the portion and subsequently forwarding of the portion to the service.

In an aspect, the data of the data package 305 further comprises additional data associated with an entity 306b-c related to the service 306a, wherein the additional data specifying an extension of the entity, and wherein the additional data being configured to be implemented in the target networked application 303b.

In an implementation, the NAEM of the networked applications 303a-c comprises a platform extensibility adapter 310 that is configured to execute the creating of the data package in the source networked application 303a. In an aspect, the extensibility adapter is implemented specific to the technology of the platform 304a on which the source networked application 303a is operated. For example, for each supported platform and extensibility mechanism a specific variant of the adapter 310 is provided that is especially adapted to the platform and service extension. In an implementation, the adapter is interfacing with an extension tool of the source networked application 303a and platform 304a and collects metadata or data from the source networked application, wherein the metadata or data is associated with the service to be extended. In an aspect, the adapter 310 augments the collected data or metadata by information (e.g. in header information) about the technology the source platform is based on and about networked application entities 306a-c related to the service and to be extended as well. For example, the service to be extended may be a generic extension of a service interface 306a of the networked applications 303a-c within the network environment 300 and the related entities may be one or more business objects 306c and/or one or more user interface extensions 306b. In an aspect, the adapter provides a platform-specific and a generic set of operations.

In an aspect, during the creating process mentioned above, the used extension tool of the source networked application 303a invokes the adapter 310 to perform its specific operations in order to create a cross networked applications service extension package (e.g., the mentioned data package) 305. In this context, extension data or metadata specify structure and/or implementation logic of the service to be extended. In an aspect, the data or metadata may also specify structure or implementation logic of service interface 306a, business logic entities (e.g., business object) 306c or user interface entities 306b. Optionally, business logic 306c or user interface 306b entities may be extended in parallel to the service interface extension 306a, e.g. to support end to end extensibility across networked applications in case that source and target networked application are based on the same development technology. Optionally, the platform extensibility adapter 310 implementations may differ within the environment 300 but cover at least the service interface extension 306a.

In an aspect, the operations performed by the adapter 310 may be called and executed at several times during the service extension process in the source networked application. In an implementation, the adapter 310 is interfacing during the injection process outlined below with the extension injector 308, the connectivity manager or with the cloud solutions landscape directory 307.

In an aspect, the operations for adoption of an extension of a service across the networked applications further comprise announcing, within a network comprising the source networked application 303a and the cloud solution landscape directory 307, that the data package 305 was created.

In an aspect, the operations for adoption of an extension of a service across the networked applications further comprise announcing, within a network comprising the source networked application 303a and at least one of the target networked applications 306b-c, that the data package 305 was created.

In an aspect, the operations for adoption of an extension of a service across the networked applications further comprise discovering, within a network comprising at least one of the target networked applications 306b-c and the cloud solution landscape directory 307, that the data package 305 was created.

In an aspect, the operations for adoption of an extension of a service across the networked applications further comprise discovering, within a network comprising the source networked application 303a and at least one of the target networked applications 306b-c, that the data package was created.

In an aspect, the operations for adoption of an extension 306a-c of a service across the networked applications 303a-c further comprise announcing (e.g., by the connectivity manager 309 configured to publish and/or discover 301 service extensions) that the data package 305 was created within the environment 300 and discovering that the data package 305 being announced within the environment 300.

In an aspect, the operations for adoption of an extension of a service across the networked applications 303a-c further comprise upon creating the data package 305 at the source platform 304a, the data package 305 being transmitted to the one or more target networked applications 303b-c that are connected via a peer-to-peer connection 302 with the source networked application 303a.

In an aspect, the operations for adoption of an extension of a service across the networked applications 303a-c further comprise upon creating the data package 305 at the source platform 304a, the data package being transmitted to the cloud solution directory 307 where the data package 305 being stored and/or being accessible on demand by at least one of the target networked applications 303b-c. In an aspect, at the cloud solutions landscape directory 307 (e.g. a central server providing information about the network landscape) the data package being accessible during the discovering process mentioned above when the associated service is accessed by the target networked application 303b-c. In an aspect, the data package 305 is shown immediately when the associated service is accessed by a networked application 303a-c during the discovering process within the cloud solution landscape directory 307. In an aspect, the connectivity manager 309 may offer services to import or export the data package 305 across networked applications 303a-c. In an aspect, the cloud solution directory 307 may notify a networked application (e.g., the target networked application) about the available service extension data package based on (e.g., by identifying or receiving notice of) services already used by the networked application. In an aspect, the cloud solutions landscape directory 307 may be especially adapted to offer automated services related to the data package such as explicitly notifying some networked applications about availability of the data package or new version of the service. This may also include services for browsing, discovering, storing and administrating of published or announced.

In an aspect, the technology of the source platform 304a is different from a technology the target platform 304b-c is based on. In an aspect, the technology of the target platform 304b-c is different from the technology of the source platform 304a by at least one of operating system, hardware infrastructure and software development platform.

In an aspect, the cloud solutions landscape directory 307 may register services and record data required to enable accessing the services so as to process service requests or service extension requests submitted by the networked applications 303a-c. In an aspect, registration of services may be performed automatically by having the networked applications 303a-c send requests to the directory. In an aspect, registration requests may be sent to specific networked applications 303a-c in response to networked applications 303a-c selecting a service they wish to add to their system configurations or applications. Details of the cloud solutions landscape directory 307 are described below in context of FIG. 4 and in related U.S. utility application with application Ser. No. 12/953,300, filed Nov. 23, 2010, the content of which is incorporated by reference herein in its entirety.

Further referring to FIG. 3. In an aspect, the operations for adoption of an extension of a service across the networked applications further comprise receiving, by the target platform 304b-c operating the target networked application 303b-c, the data package 305 associated with the service extension, extracting a portion of the data from the data package 305, and implementing the extracted portion of the data in the service of the target application 303b-c.

In an aspect, the receiving, extracting and implementing may be performed by the extension injector 308 of the target networked application 303b-c. In an aspect, the injector may interface with the adapter 310 and/or the manager 309 of the networked application 303a-c. In an aspect, the injector 308 may extract the relevant data and information needed for partial or complete implementation of the extension data package 305 in the target networked application 303b-c. In an aspect, the injector 308 may interface with services that are specific of the target platform 304b-c.

In an aspect, the operations for adoption of an extension of a service across the networked applications further comprise performing the implementing of the extracted portion of the data of the data package 305 based at least on one of: the information (e.g, the header information in the data package 305) associated with a technology on which the source platform is based on, the extracted portion of the data and a technology of the target platform operating the target networked application. In an aspect, the technology of the source platform 304a is different from a technology the target platform 304b-c is based on. In an aspect, the technology of the target platform 304b-c is different from the technology of the source platform 304a by infrastructure or models employed.

In an aspect, at least the portion of the data of the data package is arranged in a data structure configured to be implemented in the service within the target networked application 303b-c by extracting the portion and subsequently forwarding of the portion to the service. In an aspect, the data of the data package 305 further comprises additional data associated with at least one entity 306a-c related to the service, wherein the additional data specifying an extension of the entity, and wherein the additional data being configured to be implemented in the target networked application 303b.

In an aspect, the entity is one of service interface, business logic and user interface 306a-c. In an aspect, the service to be extended is associated to one of service interface, business logic and user interface 306a-c.

In an aspect, the operations for adoption of an extension of a service across the networked applications further comprise extracting a second portion of the data (e.g., the additional data mentioned above) associated with the entity related to the service and subsequently forwarding the second portion to the entity 306a-c within the target networked application 303b-c.

In an aspect, the injector 308 may identify the structure of the data in the data package 305 and/or the technology the source platform 304a is based on prior to implementing the service extension into the target networked application 303b-c and prior to forwarding the extensions of the service and potentially related entities to the associated location within the target networked application 303b-c. In an aspect, the injector 308 may be especially adapted to the target platform 304b-c and/or to the service and the related entities 306a-c to be extended.

In an implementation, the extension data package 305 may not necessarily be restricted to service interfaces that are per design and by default harmonized between all networked applications independent of the used technology (e.g., basic or system technology). The data package 305 may also include extension metadata for other entities (e.g., business object or floor plan) that are not harmonized per default in all of the networked applications 303a-c but at least in the networked application using or based on the same technology.

In an aspect, the metadata mentioned above may contain a specific section, e.g. within the structure of the data in the data package 305, for each additional entity 306b-c beyond the service interface 306a. In an aspect, the harmonization across the networked applications may be achieved by harmonizing the platform-specific operations of the extensibility adapter 310 and the corresponding extension injector 308. In an aspect, extensions of platform-specific entities are implemented specifically in the extension adapter 310 so that the metadata for specific platforms may be created during the operations for adoption of an extension of the service across the networked applications 303a-c. This may provide a coherent specific implementation in both subcomponents of the NAEM: in the platform extensibility adapter 310 and the extension injector 308.

Figure 4:
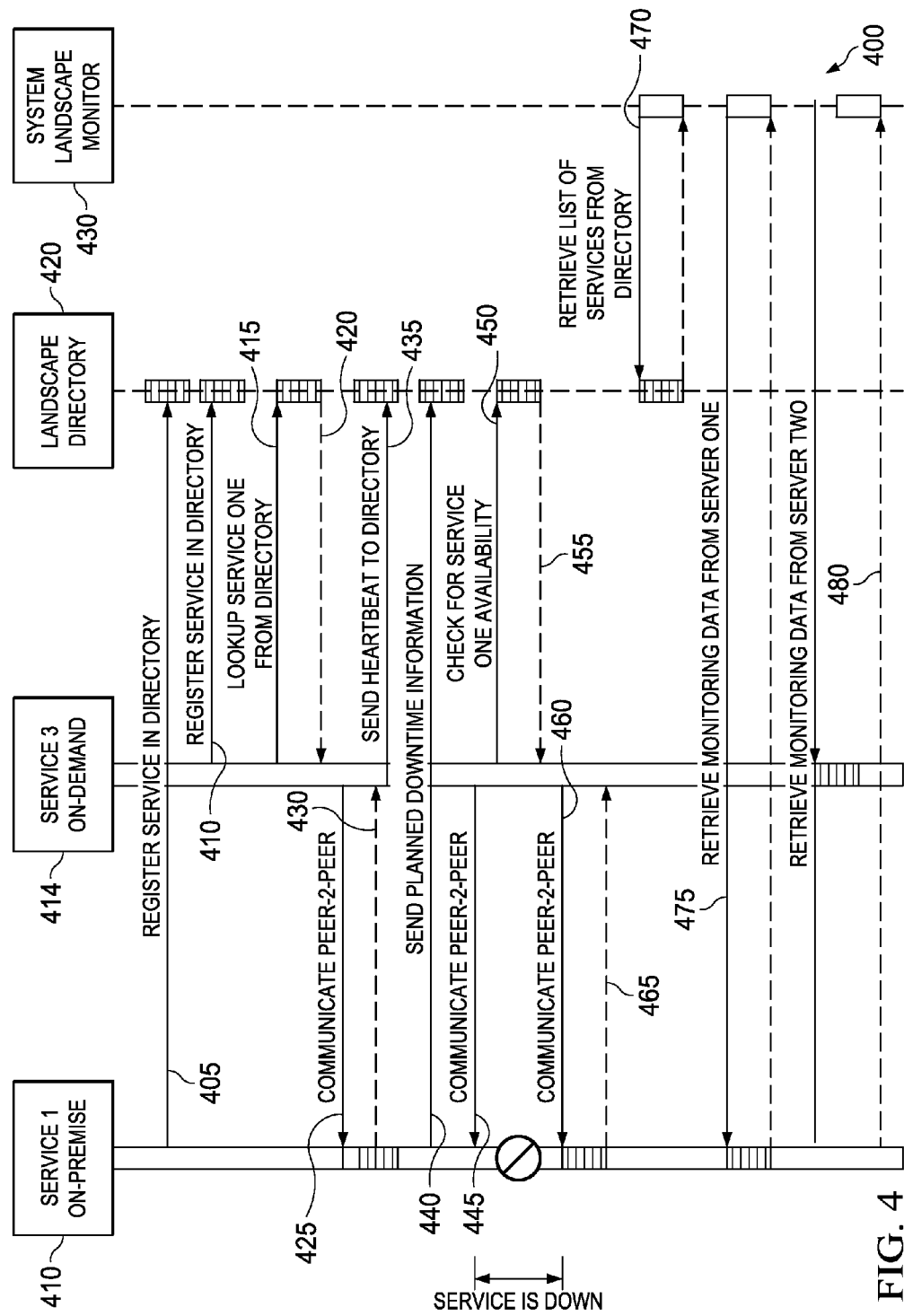
FIG. 4 describes details of a cloud solutions landscape directory adapted for adoption of an extension of a service across networked applications.

Turning to FIG. 4, which describes further details of the cloud solutions landscape directory 307, 400 (e.g., business network coordinator system 103 of FIG. 2) especially adapted for the solutions described in this specification In an aspect, the cloud solution directory 400 may notify a networked application (e.g., the target networked application) about the available service extension data package based on (e.g., by identifying or receiving notice of) services already used by the networked application. This notification may be applied to various networked applications that are based on different technologies or the same technology. In an aspect, the cloud solutions landscape directory may be especially adapted to offer automated services related to the data package such as explicitly notifying some networked applications about availability of the data package or new version of the service. This may also include services for browsing, discovering, storing and administrating of published or announced. FIG. 4 illustrates a service (e.g. the service to be extended as described in context of FIG. 2), identified as "Service 1" 410 being registered 405 in the landscape directory 420 (e.g., via a registration interface coupled to the landscape directory), and further shows "Service 3" 414 also being registered 410 in the landscape directory 420. In the example illustrated in FIG. 4, Service 1 may be an on-premise service (e.g., a custom-made application for use by a specific platform 303a-c, tenant 175a-b or client device 150a-b, referred to in this example as "Customer 1") that may be implemented at a local server operated by or on behalf of Customer 1, and which may be connected to the cloud-computing environment. Service 3 may be an on-demand service that may be operated by a third-party and may be implemented at some remote server(s) (which may also be connected to, or included in, the cloud), and which enables processing of service requests from multiple platforms 303a-c, tenants 175a-b or client devices 150a-c on a "per-use" basis.

Subsequent to registration of services, with such registration optionally including recording registration data of services in, for example, individual landscapes of networked applications 303a-c (e.g, target networked applications 306b-c) wishing to use the registered services and/or individual landscapes of the source networked applications 303a, a service request may be submitted (for example, by "Customer 1") that requires processing on Service 1 and Service 3. In some implementations, accessing of the relevant services may be performed based on the data included in the individual landscape (stored in the landscape directory) of Customer 1, or based on data stored in areas of the directory that are shared by multiple networked applications 303a-c. Thus, Customer 1's landscape data may be accessed (e.g., by communicating Customer 1's identity information, and information pertaining to the service request, to one of the landscape directory's interfaces), to determine/retrieve data required for accessing Service 1 and Service 3 (for example, obtaining the Uniform Resource Locator (URL) of Service 1 and Service 3). The access data obtained from the landscape of Customer 1 may also include connectivity information between Service 1 and Service 3 and/or data or information included in the data package associated with the service.

In the example illustrated in FIG. 4, Service 3 is to communicate with Service 1 to process, the service request. Thus, Service 3 accesses 415 the solution landscape directory (e.g., accessing Customer's 1 landscape in the directory) to determine, for example, location information, and other information, needed to contact and communicate with Service 1. The information required by Service 3 is then determined or retrieved from the landscape directory, and is communicated 420 back to Service 3. Having received the information required to contact Service 1 (e.g., URL location information), Service 3 initiates communication with Service 1 by, for example, establishing a peer-to-peer link 302 with Service 1. In the course of communicating with Service 1, Service 3 may send to Service 1 data, commands, etc., that are needed by Service 1 to perform its portion of processing to service the request. Data resulting from processing performed at Service 1, as well as signaling information required for the communication link with Service 3, is communicated 430 to Service 3.

As further shown in FIG. 4, and as described above, in some implementations, the various services may communicate access data to the landscape directory, including data about the services' status and availability. Such communicated data may then be recorded in areas of the directory shared by multiple networked applications 303a-c, and/or in individual landscapes of networked applications using the respective applications sending the access data. In the example of FIG. 4, Service 3 sends 435 a heartbeat message, at a pre-determined frequency, to indicate that Service 3 is still active. The landscape directory is subsequently updated based on the heartbeat message, e.g., the records corresponding to Service 3 in Customer 1's landscape are updated with data indicating that Service 2 is still active. Service 1, on the other hand, sends 340 a notification of a planned downtime to the landscape directory, and that information is likewise used to update the directory, e.g., the record(s) corresponding to Service 1 in Customer 3's landscape is updated with data representative that the downtime scheduled for Service 1 (Service 1 may also send periodic heartbeat message during times at which it is not down).

Subsequent to the sending by Service 1 of the notification of the downtime, Service 1 becomes unavailable (i.e., the service is down as depicted in FIG. 4). As a result, as shown at 445 an on-going or a new attempt to establish communication between Service 3 and Service 1 fails. In response to detection of communication failure, Service 3 contacts 450 the solution landscape directory to check the availability information of Service 1 (communication between Service 3 and the landscape directory may be performed using the landscape directory's interfaces). In response, the landscape directory sends 455 to Service 3 data about the availability of Service 1 based on the access data stored in the directory (the stored access data includes, in the example of FIG. 4, data representative of the downtime of Service 1 that was stored in the directory in response to the notification the directory received from Service 1 at 440. The data sent (at 455) to Service 3 includes data indicative of the fact that Service 1 is presently down, and may also include information about when Service 1 is expected to become available again. Based on the data Service 3 receives regarding the availability of Service 1, Service 3 may re-establish, e.g., at a time instance when Service 1 become available again, the communication link with Service 1 (at 460). Data, signaling information and/or commands are communicated 465 by Service 1 back to Service 3.

As described in relation to FIG. 2, in some embodiments, system landscape monitor 136, 430s may be used to monitor at least some of the networked applications or services and to determine, for example, status and availability of the at least some of the networked applications or services. Thus, as further shown in FIG. 4, the system landscape monitor 136, 430 may initially retrieve 470 from the solution landscape directory a list of services (such as Service 1 and Service 3) with respect to which it is to determine status and availability information. To retrieve such a list, the system landscape monitor 136, 430 may send a request to the solution landscape directory to determine and send back the list that includes at least one service that is to be monitor. In response to receiving the request for the list, the solution landscape directory transmits back to the system landscape monitor 136, 430 the determined list. The list may be determined based on data stored in areas of the directory shared by multiple networked applications, as well as networked application-specific data stored in the individual landscapes in the directory.

Having retrieved the list of services to be monitored (in the example of FIG. 4, the list includes Service 1 and Service 3), the system landscape monitor 136, 430 accesses and communicates with the services to be monitored and retrieves relevant monitoring data, which may include status and availability data, e.g., whether the system landscape monitor 136, 430 service are still active, whether any downtime is scheduled at some later point, whether the services have malfunctions, current workload information, etc. Thus, for example, the system landscape monitor 136, 430 accesses and communicates with Service 1 and Service 3 to retrieve 475 and 480 their respective monitoring data, including the respective status or availability data for Service 1 and Service 3. Retrieved monitoring data, including retrieved status or availability data, are then used to update the solution landscape directory. For example, the records in Customer's 1 landscape corresponding to Service 1 and Service 3 may be updated with the retrieved monitoring data. Each of the various components and operations depicted in FIG. 4 may be implemented using at least one processor-based device (e.g., a computer).

Figure 5:
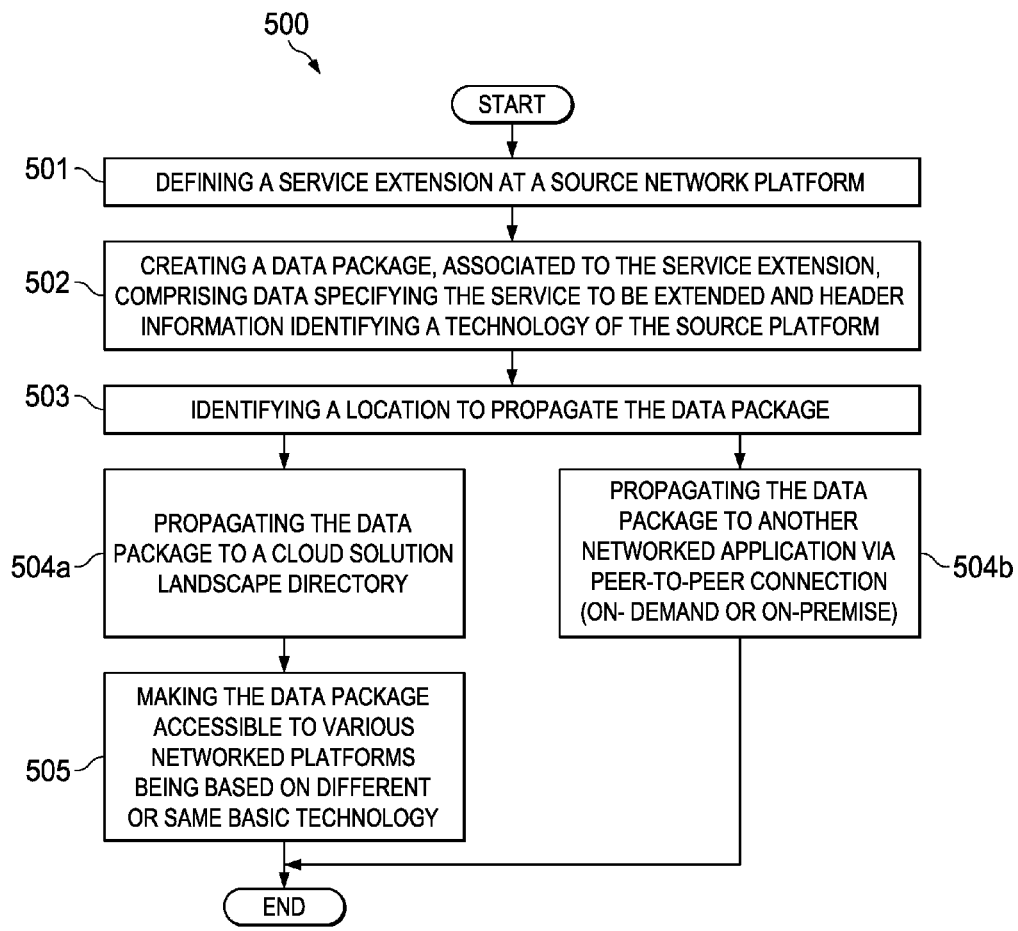
FIG. 5 illustrates an exemplary method for creating an extension of a service for adoption across networked applications.

Turning to FIG. 5, FIG. 5 illustrates an exemplary method or process 500 for creating an extension of a service for adoption across networked applications. After the process is started, a service extension is defined at step 501 at the source networked application being operated by a source platform.

At 502, a data package associated to the service extension at the source platform is created, wherein the source networked application is communicatively coupled to the target networked application or to a cloud solution landscape directory. In an aspect, the data package comprises data specifying the service to be extended (e.g., metadata of the extension of the service) and header information collected at the source networked application, wherein the data and the header information are arranged in a data structure configured to be propagated across the network environment (e.g., networked applications and cloud solutions landscape directory) and configured to be implemented by another networked application (e.g., the target networked application). In an aspect, the extension of the service is an extension of a functionality or attribute associated with a service interface, a business logic, a business object or a user interface within a networked application (e.g., the target networked application).

In an aspect, the data includes metadata of the extension of the service or data associated to an entity that is related to the service to be extended and may also be extended upon extension of the service. In an aspect, the data (e.g., the metadata of the extension of the service) may specify the service to be extended and the header information may identify a technology of the source platform at which the data package was created. In an aspect, the entity is one of service interface, business logic and user interface, and wherein the service is associated to one of service interface, business logic and user interface.

In an aspect, the structure or format of the data may be identified by the source networked application so that the service extension is configured to be implemented by another networked application (e.g., the target networked application). In an aspect, the data may be in XML format.

At 503, a location is identified (e.g., a location within the network environment 300 in FIG. 3) to propagate the data package. In an aspect, the identified location may be another networked application (e.g., the target networked application) or the cloud solution landscape directory.

At 504a, the data package is propagated to a cloud solution landscape directory, where the data package may be stored in a memory. In an aspect, upon creating the data package at the source platform, the data package being propagated to the cloud solution directory.

At 504b, the data package is propagated via, e.g. a peer-to-peer connection, to another networked application (e.g., the target networked application) for on-demand or on-premise usage.

At 505, the data package is made accessible to various networked platforms being based on different or same technology. In an aspect, the data package being accessible immediately at the cloud solution landscape directory by the target networked application or the data package being accessible when the service associated to the data package is accessed by the target networked application on demand. In an aspect, the technology of the target networked application is different from the technology of the source networked application by infrastructure or models employed.

In an aspect, process 500 may comprise announcing (e.g. by the connectivity manager at the source networked application), that the data package was created.

After these operations, the process may end or may continue with the steps described below in context of FIG. 6.

Figure 6:
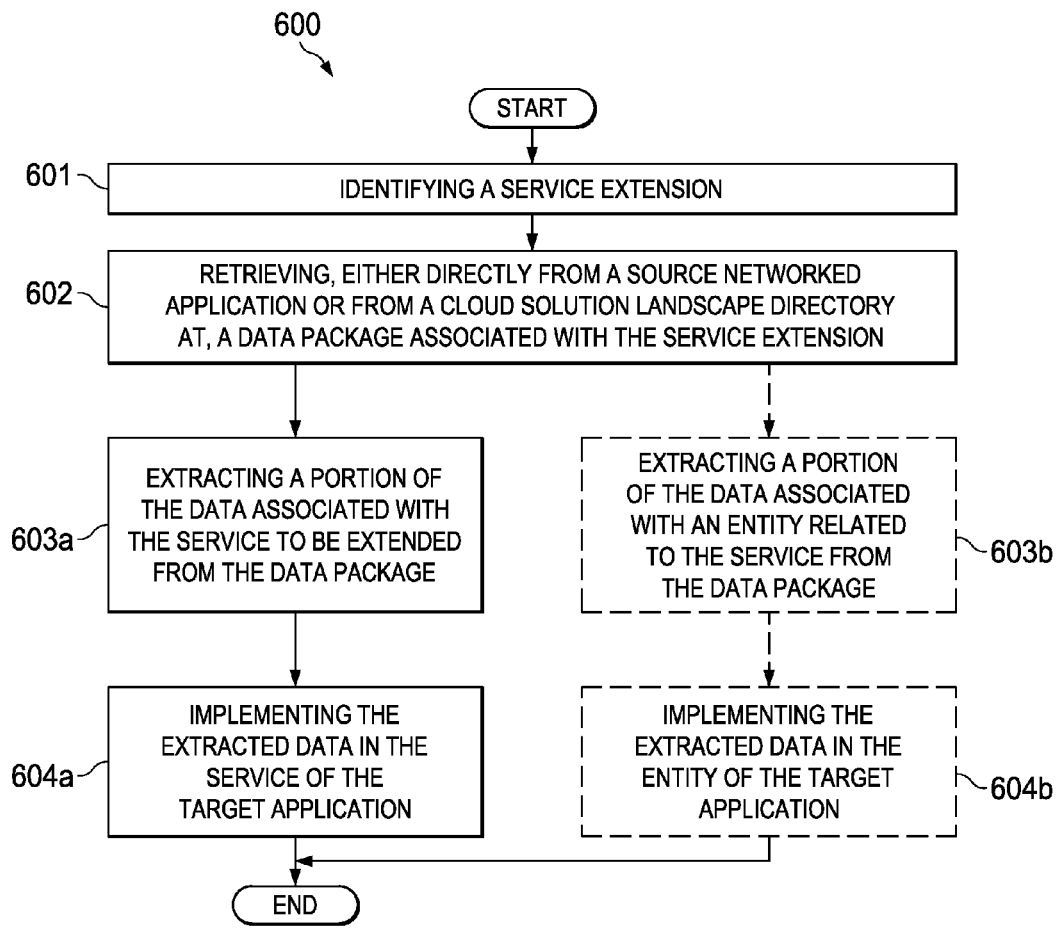
FIG. 6 illustrates an exemplary method for retrieving an extension of a service for adoption across networked applications.

Turning to FIG. 6, FIG. 6 illustrates an exemplary method or process 600 for retrieving an extension of a service for adoption across networked applications. After the process is started, a service extension is identified at 601 (e.g., by the connectivity manager discovering that a data package associated to the service extension was announced). In an aspect, process 600 may comprise discovering that the creation of the data package associated with a service extension being announced.

At 602, a data package associated with the service extension is retrieved, either directly (e.g., via a peer-to-peer network connection) from another networked application (e.g., the source networked application where the data package was created) or from the cloud solution landscape directory. The data package may be retrieved at a target platform operating a target networked application. The data package may comprise, e.g., data specifying the service to be extended (e.g., metadata of the extension of the service) and header information associated with a technology of a source platform at which the data package was created.

At 603*a*, a portion of the data from the data package, that is associated to the service to be extended, is extracted. In an aspect, the extracted data may be translated by the process 600 from one data format (e.g. XML) do another data format specified by the target networked application.

At 604*a*, the extracted portion of the data is implemented or injected in the service of the target networked application.

In an aspect, the data of the data package further comprises additional data associated with an entity related to the service, wherein the additional data specifying an extension of the entity, and wherein the additional data being configured to be implemented in the target networked application.

At 603*b*, a portion of the data from the data package that is associated (if available) with an entity related to the service to be extended may optionally be extracted. In an aspect, the extracted data may be translated by the process 600 from one data format (e.g. XML) do another data format specified by the target networked application.

At 604*b*, the extracted data associated with the entity may optionally be implemented or injected into the entity of the target application.

In an aspect, wherein at least the extracted data of the data package is arranged in a data structure configured to be implemented in the service within the target networked application by extracting the portion and subsequently forwarding of the portion to the service and/or the entity.

In an aspect, the implementing of the service extension and potential entity extension may be based at least on one of the header information, the extracted data and a technology of the target platform operating the target networked application.

After these operations, the process 600 may end.

The preceding figures and accompanying description illustrate example processes and computer implementable techniques. But environment 100, 200, 300 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100, 200, 300 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for adoption of an extension of a service across networked applications, the method comprising:

receiving, by a target networked application operated by a target platform, a data package associated with the extension, wherein the extension is applied to a source networked application operated by a source platform, wherein the source networked application is different than the target networked application, the data package comprising data specifying the service to be extended and information specifying at least one of structure and implementation logic of the service to be extended specific to a technology of the source platform at which the data package was created;

extracting a portion of the data from the data package; and implementing the extracted portion of the data in the service of the target application based on the information specifying at least one of the structure and the implementation logic within the data package.

2. The method of claim 1, further comprising:

creating the data package at the source platform, wherein the source platform operates a source networked application that is communicatively coupled to the target networked application or to a cloud solution directory; and announcing creation of the data package.

3. The method of claim 1, wherein the data specifying the service to be extended comprises metadata of the extension of the service, and wherein the data and the information of the data package are arranged in a data structure configured to be propagated across the networked applications, the networked applications comprising the source networked application and the target networked application.

4. The method of claim 1, wherein the source platform and the target platform are based on different technologies, wherein the technologies are different by at least one of operating system, hardware infrastructure and software development platform.

5. The method of claim 2, wherein the networked applications comprise the target networked application and the source networked application and the networked applications being distributed within a network, wherein the network is a cloud-computing environment including a cloud solution directory and the method is further comprising:

discovering announcement of the data package.

6. The method of claim 5, wherein upon creating the data package at the source platform, the data package being transmitted to the cloud solution directory where the data package being accessible on demand by the target networked application, or where the data package being accessible during the discovering when the associated service is accessed by the target networked application.

7. The method of claim 2, wherein upon creating the data package at the source platform, the data package is transmitted to the target networked application connected via a peer-to-peer connection with the source networked application.

8. A computer program product encoded on a non-transitory, tangible storage medium, the product comprising computer readable instructions for causing one or more processors to perform operations for adoption of an extension of a service across networked applications, the operations comprising:

receiving, by a target networked application operated by a target platform, a data package associated with the extension, wherein the extension is applied to a source networked application operated by a source platform, wherein the source networked application is different than the target networked application, the data package comprising data specifying the service to be extended and information specifying at least one of structure and implementation logic of the service to be extended specific to a technology of the source platform at which the data package was created;

extracting a portion of the data from the data package; and implementing the extracted portion of the data in the service of the target application based on the information specifying at least one of the structure and the implementation logic within the data package.

9. The computer program product of claim 8, further comprising:
creating the data package at the source platform, wherein the source platform operates a source networked application that is communicatively coupled to the target networked application or to a cloud solution directory; and
announcing creation of the data package.

10. The computer program product of claim 8, wherein the data specifying the service to be extended comprises metadata of the extension of the service, and wherein the data and the information of the data package are arranged in a data structure configured to be propagated across the networked applications, the networked applications comprising the source networked application and the target networked application.

11. The computer program product of claim 8, wherein the source platform and the target platform are based on different technologies, wherein the technologies are different by at least one of operating system, hardware infrastructure and software development platform.

12. The computer program product of claim 9, wherein the networked applications comprise the target networked application and the source networked application and the networked applications being distributed within a network, wherein the network is a cloud-computing environment including a cloud solution directory and the method is further comprising:
discovering announcement of the data package.

13. The computer program product of claim 12, wherein upon creating the data package at the source platform, the data package being transmitted to the cloud solution directory where the data package being accessible on demand by the target networked application, or where the data package being accessible during the discovering when the associated service is accessed by the target networked application.

14. The computer program product of claim 9, wherein upon creating the data package at the source platform, the data package being transmitted to the target networked application that is connected via a peer-to-peer connection with the source networked application.

15. A system, comprising:
one or more computers; and
a non-transitory computer-readable storage medium coupled to the one or more computers having instructions stored thereon which, when executed by the one or more computers, cause the one or more computers to perform operations for adoption of an extension of a service across networked applications, the operations comprising:
receiving, by a target networked application operated by a target platform, a data package associated with the extension, wherein the extension is applied to a source networked application operated by a source platform, wherein the target platform and the source platform are a common platform, and wherein the source networked application is different than the target networked application, the data package comprising data specifying the service to be extended and information specifying at least one of structure and implementation logic of the service to be extended specific to a technology of the source platform at which the data package was created;
extracting a portion of the data from the data package; and
implementing the extracted portion of the data in the service of the target application based on the information specifying at least one of the structure and the implementation logic within the data package.

16. The system of claim 15, further comprising:
creating the data package at the source platform, wherein the source platform operates a source networked application that is communicatively coupled to the target networked application or to a cloud solution directory; and
announcing creation of the data package.

17. The system of claim 15, wherein the data specifying the service to be extended comprises metadata of the extension of the service, and wherein the data and the information of the data package are arranged in a data structure configured to be propagated across the networked applications, the networked applications comprising the source networked application and the target networked application.

18. The system of claim 16, wherein the networked applications comprise the target networked application and the source networked application and the networked applications being distributed within a network, wherein the network is a cloud-computing environment including a cloud solution directory and the method is further comprising:
discovering announcement of the data package.

19. The system of claim 18, wherein upon creating the data package at the source platform, the data package being transmitted to the cloud solution directory where the data package being accessible on demand by the target networked application, or where the data package being accessible during the discovering when the associated service is accessed by the target networked application.

20. The system of claim 16, wherein upon creating the data package at the source platform, the data package being transmitted to the target networked application that is connected via a peer-to-peer connection with the source networked application.

21. A system, comprising:
one or more computers; and
a non-transitory computer-readable storage medium coupled to the one or more computers having instructions stored thereon which, when executed by the one or more computers, cause the one or more computers to perform operations for adoption of an extension of a service across networked applications, the operations comprising:
creating, by a source networked application operated by a source platform, a data package associated with the extension to the source networked application, the data package comprising data specifying the service to be extended and information specifying at least one of structure and implementation logic of the service to be extended specific to a technology on which the source platform is based on, wherein the data and the information of the data package are arranged in a data structure configured to be propagated across the networked applications, the networked applications comprising the source networked application and a target networked application, and wherein the source networked application is communicatively coupled to the target networked application or to a cloud solution directory;
announcing creation of the data package;
discovering announcement of the data package;
receiving, by the target networked application operated by the target platform, the data package associated with the extension to the source networked application, wherein the source networked application is different than the target networked application;

extracting a portion of the data from the data package; and implementing the extracted portion of the data in the service of the target application based on the information specifying at least one of the structure and the implementation logic within the data package.

22. The system of claim 21, wherein the technology of the source platform is different from a technology the target platform is based on by at least one of operating system, hardware infrastructure and software development platform.

23. The system of claim 21, wherein the data package further comprising additional data associated with an entity related to the service, wherein the additional data specifying an extension of the entity, and wherein the service to be extended is a generic extension of a service interface of the networked applications and the related entity is a business object or a user interface.

* * * * *